(12) United States Patent
Hiltunen et al.

(10) Patent No.: US 7,536,595 B1
(45) Date of Patent: May 19, 2009

(54) SYSTEMS, DEVICES, AND METHODS FOR INITIATING RECOVERY

(75) Inventors: Matti Hiltunen, Chatham, NJ (US); Richard Schlichting, New Providence, NJ (US); Kaustubh Joshi, Urbana, IL (US); William Sanders, Mahomet, IL (US)

(73) Assignee: AT&T Intellectual Property, II, L.P., Bedminster, NJ (US)

( * ) Notice: Subject to any disclaimer, the term of this patent is extended or adjusted under 35 U.S.C. 154(b) by 513 days.

(21) Appl. No.: 11/273,193

(22) Filed: Nov. 14, 2005

Related U.S. Application Data

(60) Provisional application No. 60/728,183, filed on Oct. 19, 2005.

(51) Int. Cl.
*G06F 11/00* (2006.01)
(52) U.S. Cl. ...................................................... 714/26
(58) Field of Classification Search .................... 714/26
See application file for complete search history.

(56) References Cited

U.S. PATENT DOCUMENTS

| | | | |
|---|---|---|---|
| 6,456,622 B1 * | 9/2002 | Skaanning et al. | 370/389 |
| 6,535,865 B1 | 3/2003 | Skaanning | |
| 6,751,661 B1 | 6/2004 | Geddes | |
| 6,772,374 B2 * | 8/2004 | Forman et al. | 714/46 |
| 6,879,973 B2 * | 4/2005 | Skaanning et al. | 706/52 |
| 2003/0093514 A1 * | 5/2003 | Valdes et al. | 709/224 |
| 2004/0205182 A1 | 10/2004 | Geddes | |
| 2005/0015644 A1 | 1/2005 | Chu | |
| 2005/0028033 A1 | 2/2005 | Kipersztok | |
| 2007/0260911 A1 * | 11/2007 | Marilly et al. | 714/4 |
| 2007/0288795 A1 * | 12/2007 | Leung et al. | 714/26 |
| 2008/0059839 A1 * | 3/2008 | Hamilton et al. | 714/26 |

OTHER PUBLICATIONS

M. K. Aguilera, J. C. Mogul, J. L. Wiener, P. Reynolds, and A. Muthitacharoen, "Performance Debugging for Distributed Systems of Black Boxes", In Symposium on Operating Systems Principles, 2003, 16 pages.

G. Candea, J. Cutler, A. Fox, R. Doshi, P. Gang, and R. Gowda, "Reducing Recovery Time in a Small Recursively Restartable System", In Proceedings of the 2002 International Conference on Dependable Systems and Networks, Jun. 2002, 10 pages, Washington, DC.

J. Kephart and D. Chess, "The Vision of Autonomic Computing", IEEE Computer, Jan. 2003, pp. 41-50, 36(1).

D. Oppenheimer, A. Brown, J. Beck, D. Hettena, J. Kuroda, N. Treuhaft, D. Patterson, and K. Yelick, ROC-1: Hardware Support for Recovery-Oriented Computing, IEEE Transactions on Computers, Feb. 2002, pp. 100-107, vol. 51, No. 2.

(Continued)

*Primary Examiner*—Bryce P Bonzo
(74) *Attorney, Agent, or Firm*—Michael Haynes PLC; Michael N. Haynes

(57) ABSTRACT

Certain exemplary embodiments comprise method that can comprise receiving information indicative of a fault from a monitor associated a network. The method can comprise, responsive to the information indicative of the fault, automatically determining a probability of a fault hypothesis. The method can comprise, responsive to a determination of the fault hypothesis, automatically initiating a recovery action to correct the fault.

19 Claims, 9 Drawing Sheets

1000

OTHER PUBLICATIONS

D. Blough and A. Pelc, "Diagnosis and Repair in Multiprocessor Systems", IEEE Transactions on Computer, Feb. 1993, pp. 205-217, vol. 42, No. 2.

M. Blount, "Probabilistic Treatment of Diagnosis in Digital Systems", In Proceedings of the 7th Symposium of Fault-Tolerant Computing, 1977, pp. 72-77.

Y. Chang, L. Lander, H.-S. Lu, and M. Wells, "Bayesian Analysis for Fault Location in Homogenous Distributed Systems", In Proceedings of the 12th Symposium on Reliable Distributed Systems, Oct. 1993, pp. 44-53.

Y.-F. Chen, H. Huang, R. Jana, T. Jim, M. Hiltunen, S. John, S. Jora, R. Muthumanickam, and B. Wei. "iMobile EE—An Enterprise Mobile Service Platform", ACM Journal on Wireless Networks, 9(4), Jul. 2003, pp. 283-297.

H. de Meer and K. S. Trivedi, "Guarded Repair of Dependable Systems", Theoretical Computer Science, 128, 1997, pp. 179-210.

S. Hosseini, J. Kuhl, and S. Reddy, "A Diagnosis Algorithm for Distributed Computing Systems with Dynamic Failure and Repair", IEEE Transactions on Computers, Mar. 1984, pp. 223-233, vol. C-33, No. 3.

Y. Huang and C. Kintala, "A Software Fault Tolerance Platform", In B. Krishnamurthy, editor, Practical Reuseable Unix Software, 1995, pp. 223-245, John Wiley.

Y. Huang, C. Kintala, N. Kolettis, and N. Fulton, "Software Rejuvenation: Analysis, Module and Applications", In Proceedings of the 25th International Symposium on Fault-Tolerant Computing, Jun. 1995, pp. 381-390.

M. Littman, N. Ravi, E. Fenson, and R. Howard, "An Instance-based State Representation for Network Repair", In Proceedings of the 19th National Conference on Artificial Intelligence (AAAI 2004), Jul. 2004, pp. 287-292.

M. Malek, "A Comparison Connection Assignment for Diagnosis of Multiprocessor Systems", In Proceedings of the 7th Annual Symposium on Computer Architecture, 1980, pp. 31-36.

E. Preparata, G. Metze, and R. Chien, "On the Connection Assignment Problem of Diagnosable Systems", IEEE Transactions on Electronic Computers, Dec. 1967, pp. 848-854, vol. EC-16, No. 6.

K. G. Shin, C. M. Krishna, and Y.-H. Lee, "Optimal Dynamic Control of Resources in a Distributed System", IEEE Transactions on Software Engineering, Oct. 1989, pp. 1188-1198, vol. 15, No. 10.

J. Case, M. Fedor, M. Schoffstall, and J. Davin, "A Simple Network Management Protocol (SNMP)", Network Working Group, Request for Comments 1157, Obsoletes: RFC 1098, May 1990, pp. 1-36.

G. Monahan, "A Survey of Partially Observable {M}arkov Decision Processes: {Theory}, Models, and Algorithms", Management Science, Jan. 1982, pp. 1-16, vol. 28, No. 1.

S. Ruan, F. Tu, and K. Pattipati, "On Multi-Mode Test Sequencing Problem", Proc. of IEEE Systems Readiness Technology Conf., Sep. 2003, pp. 194-201.

* cited by examiner

1000

2000

SYSTEMS, DEVICES, AND METHODS FOR INITIATING RECOVERY

CROSS-REFERENCES TO RELATED APPLICATIONS

This application claims priority to, and incorporates by reference herein in its entirety, pending U.S. Provisional Patent Application Ser. No. 60/728,183, filed 19 Oct. 2005.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DEFINITIONS

Figure 1:
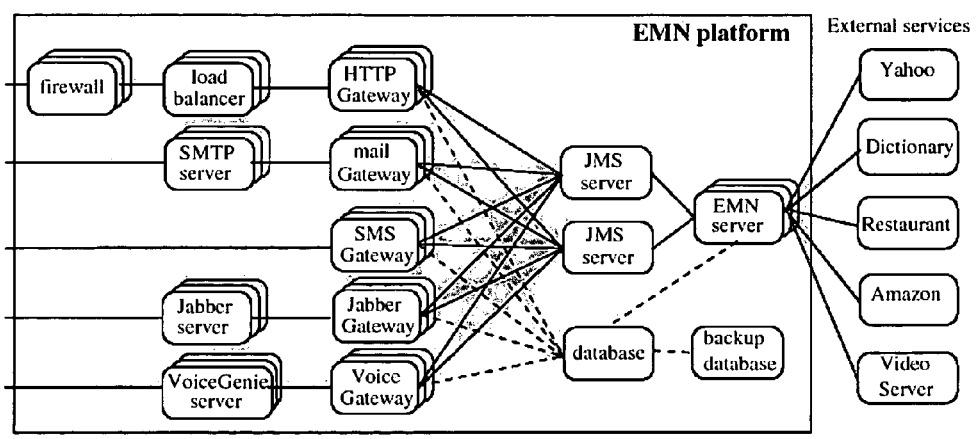
FIG. 1 is a schematic diagram of an exemplary EMN architecture 1000.

When the following terms are used herein, the accompanying definitions apply:

a—at least one.
activity—an action, act, step, and/or process or portion thereof.
adapted to—capable of performing a particular function.
allowed—possible to use.
and/or—either in conjunction with or in alternative to.
apparatus—an appliance or device for a particular purpose.
associated—related to.
automatically—acting or operating in a manner essentially independent of external human influence or control. For example, an automatic light switch can turn on upon "seeing" a person in its view, without the person manually operating the light switch.
backbone network—a "transit" network often made up of long-distance telephone trunk lines and/or other wired and/or wireless links such as microwave and satellite links for use in transmitting large amounts of data simultaneously between host computer systems connected to the Internet. Normal communicated data typically neither originates nor terminates in a backbone network.
Bayesian estimation—a value determined according to Bayes' theorem by combining prior knowledge and experimental observation to obtain posterior knowledge.
Bayesian formula—the mathematical expression of Bayes' theorem, which is expressed by an equation:

$$P[A \mid B] = \frac{P[A \cap B]}{P[B]}.$$

Boolean-valued—having a value of true or false.
calculate—compute.
can—is capable of, in at least some embodiments.
combination—two or more values.
comprising—including but not limited to.
correct—to remedy.
cost—an amount of time and/or money associated with an activity.
data—distinct pieces of information, usually formatted in a special or predetermined way and/or organized to express concepts.
define—to establish the outline, form, or structure of.
determine—ascertain, obtain, and/or calculate.
device—a machine, manufacture, and/or collection thereof.
equation—a determinable mathematical expression.
estimate—a calculated value approximating an actual value.
execute—to carry out instructions.
failure modes—different ways in which a device and or system can experience a fault.
false—a state of not being true.
fault—an undesired and/or dysfunctional system state.
fault coverage—a probability that a monitor will detect a fault given that the fault has occurred.
fault hypothesis—a tentative explanation of a cause of a fault.
generated—created.
heuristic—an expert rule that is modifiable based upon knowledge gained over time through experience. Heuristics are often referred to as "rules of thumb."
historical component behavior—a measured observation related to a device and/or system.
hypothesis—a tentative explanation.
identify—recognize or detect.
impulse cost—a cost that accrues instantaneously.
indicative—serving to indicate.
indicator function—a logical function that has a value of one if true and zero otherwise.
information—processed, stored, and/or transmitted data.
information device—any device capable of processing information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

initiating—beginning.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

instructions—directions adapted to perform a particular operation or function.

learn—gain knowledge and/or change a rule based upon experience.

likelihood—probability.

limit—a furthest extent of a range of values.

lowest—smallest in magnitude among alternatives considered.

machine instructions—directions adapted to cause a machine to perform a particular operation or function.

machine readable medium—a physical structure from which a machine can obtain data and/or information. Examples include a memory, punch cards, etc.

Markov Decision Process (MDP)—a probabilistic model of a sequential decision problem, where the current state and the action selected determine a probability distribution on future state. Such model can provide a method for reasoning about the tradeoffs of taking different actions (e.g., machine reboot vs. application restart) in a system.

may—is allowed and/or permitted to, in at least some embodiments.

measurement—an observed characteristic.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

minimum—having a lowest value.

model—to schematically describe.

modify—to change.

monitor—a device, set of instructions, and/or system adapted to measure a status of a network device, system, and/or sub-system.

most probable—having a highest calculated probability.

network—a communicatively coupled plurality of nodes.

network interface—any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.

notify—inform.

null hypothesis—a default fault hypothesis stating that no component in the system is faulty.

number—a count.

obtain—to procure and/or receive.

operator—an entity responsible for controlling and/or maintaining a device and/or system.

otherwise—under other circumstances.

outcome—result.

output—information provided by.

partially observable Markov decision process (POMDP)—a MDP where the state of the model (i.e., the system being modeled) is not fully observable. For example, it is not know if some component in the system has failed or if it is operational. The system state is estimated based on observations of the system behavior (e.g., the output of the monitors).

path—a network route over which information travels between a first information device and a second information device, with any number of intermediate devices located on the route.

plurality—the state of being plural and/or more than one.

possible—capable of happening, existing, and/or being true without contradicting proven facts, laws, and/or circumstances.

predetermined—established in advance.

predicate—the condition under which a statement is either true or false.

predicted—expected in advance.

present—existing.

probability—a quantitative expression of a likelihood of an occurrence.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

provide—to furnish and/or supply.

rate cost—a cost that accrues continuously with time.

reboot—restart an information device.

receive—accept something provided and/or given.

recovery—return to a normal state after a fault has occurred.

recovery action—one or more steps adapted to attempt to correct a fault.

recursions—a repeated execution of one or more activities.

relative—in comparison with.

remaining cost of recovery—an amount of time and/or money not calculated by recursive Markov method calculations.

render—make perceptible to a human, for example as data, commands, text, graphics, audio, video, animation, and/ or hyperlinks, etc., such as via any visual, audio, and/or haptic means, such as via a display, monitor, electric paper, ocular implant, cochlear implant, speaker, etc.

repeatedly—again and again; repetitively.

request—a communication asking for a response and/or service.

responsive—reacting to an influence and/or impetus.

restarting—starting a software application after first shutting the software application down or starting a software application after it has stopped on its own (e.g., by crashing).

selected—chosen from a plurality of alternatives.

sending—to convey.

sequence—an ordered set.

service—a software application on a first information device adapted to be accessed by a second information device. Possible embodiments of services comprise Internet search engine, dictionary, travel scheduler, restaurant reservation scheduler, video provision (e.g., playing, rendering, streaming, storing, editing, serving, selling, leasing, licensing, and/or transferring, etc.), mp3 provision, audio provision, photo provision, image provision, animation provision, graphics provision, text provision, content provision, file provision, file storage, printing management, database access, VOIP, voice telecommunication, custom software provision, and/or backend for a thin client for application software, etc.

set—a related plurality.

size—magnitude.

starting—beginning.

state—a qualitative and/or quantitative description of condition.

substantially—to a great extent or degree.

system—a collection of mechanisms, devices, data, and/or instructions, the collection designed to perform one or more specific functions.

terminating—ending.

time taken—an elapsed interval of time for one or more activities.

true—in accord with reality, fact, or truthfulness.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

via—by way of and/or utilizing.

DETAILED DESCRIPTION

Certain exemplary embodiments provide a method that can comprise receiving information indicative of a fault from a monitor associated a network. The method can comprise, responsive to the information indicative of the fault, automatically determining a probability of a fault hypothesis. The method can comprise, responsive to a determination of the fault hypothesis, automatically initiating one or more recovery actions to correct the fault.

Automatic system monitoring and recovery has a potential to provide a low-cost solution for high availability. However, automating recovery can be difficult in practice because of the challenge of accurate fault diagnosis in the presence of low coverage, poor localization ability, and false positives that can be inherent in many widely used monitoring techniques. Certain exemplary embodiments can comprise a holistic model-based approach that can overcome many of these challenges for automatic recovery in distributed systems. Certain exemplary embodiments can utilize theoretically sound techniques comprising Bayesian estimation and Markov decision theory to provide controllers that choose good, if not optimal, recovery actions according to user-defined optimization criteria. By combining monitoring and recovery, the approach can realize benefits that could not have been obtained by the techniques in isolation.

Building computer systems that are highly available can be desired in certain application areas, but the increased use of computer systems in new application areas (e.g., entertainment and e-commerce) can make low-cost solutions for high availability more desirable. Traditional approaches for high availability can be based on the combination of redundancy and operations support covering twenty four hour per day, seven day per week in which human operators can detect and repair failures and restore redundancy before the service provided by the system is compromised. However, both redundancy and operations support covering twenty four hour per day, seven day per week can be expensive, and this cost may be prohibitive for certain application domains. Therefore, automated recovery of failed hardware and software components (especially through restart) can be desirable.

Automation of system recovery in realistic distributed systems can be complicated. In certain exemplary embodiments, a system can determine which components have failed before recovery actions are chosen. In practical systems, the monitoring system can comprise a collection of different monitoring components. For example, while complete off-the-shelf (COTS) components (e.g., databases, firewalls, and load balancers) can include monitoring solutions or provide interfaces for standards-based (e.g., Simple Network Management Protocol (SNMP)) monitoring, proprietary components might not comprise monitoring and/or might comprise some proprietary methods. Additionally, an overall system can comprise a monitoring method adapted to verify that the system is able to provide its service (path monitoring such as end-to-end path monitoring). However, such monitoring systems can have incomplete coverage and diagnosability, and can be geared to alert the operators, who have to use their domain knowledge and other tools to determine what corrective action to take (e.g. which component to restart). Component monitoring mechanisms can also provide conflicting information and can suffer from the problems of false positives (e.g., due to timeout-based testing) and false negatives (e.g., a general monitoring test might not detect an application-specific problem). Furthermore, a system might allow a number of possible recovery actions (e.g., restart component, reboot host, or migrate components to another host), and it might not be easy to determine which action to choose.

In certain exemplary embodiments, a holistic approach to automatic recovery in distributed systems can utilize a theoretically well-founded model-based mechanism for automated failure detection, diagnosis, and recovery that realizes benefits that could not be achieved by performing individual algorithms for detection and recovery in isolation. In certain exemplary embodiments, combining recovery actions with diagnosis can allow the system to diagnose, and recover from, fault scenarios that might not be diagnosable using system diagnosis only, and can invoke additional monitoring when it would help choosing the right recovery action. Certain exemplary embodiments can work with imperfect monitoring systems that may already be present in the target system, and with any application specific recovery actions available to the target system. Certain exemplary embodiments comprise Bayesian estimation and Markov decision processes to provide a recovery controller that can choose recovery actions based on several optimization criteria. Certain exemplary embodiments comprise an ability to detect whether a problem is beyond diagnosis and recovery capabilities, and thus, to determine when a human operator can be alerted. Certain exemplary embodiments can be applicable to a wide variety of practical systems. Certain exemplary embodiments can comprise a small, but realistic deployment of the Enterprise Messaging Network (EMN) platform developed at AT&T Corporation (Bedminster, N.J.). Fault injection results can be provided that compare the efficiency of certain exemplary embodiments with a theoretical optimum.

FIG. 1 is a schematic diagram of an exemplary EMN architecture 1000. An EMN can be a general platform for providing services to a wide range of mobile and wireless devices such as cell phones, pagers, and PDAs via any of a plurality of protocols such as WAP, e-mail, voice, or SMS. Architecture 1000 can comprise replicated software components, some of which are proprietary (e.g., front-end protocol gateways and back-end application/EMN servers), and some of which are Commercial Off The Shelf (COTS) (e.g., a database, load-balancers, protocol servers, firewalls, and JMS (Java Message Service) servers). High service availability can be a goal for the EMN platform. However high service availability can be costly when achieved through human operations support twenty-four hours per day for seven days per week. Rapid automated fault recovery can provide both cost and availability benefits.

A source of problem detection information (used by operations staff) in an EMN deployment can be an automated monitoring system that is based on a combination of component and/or path monitors. Path monitoring can be adapted to verify that a system as a whole is operational by submitting test requests to the system (via the front-end protocol servers) and verifying that the system generates valid replies. The system can comprise a plurality of information devices communicatively coupled via a network. However, because each test can involve a number of individual components, it might be difficult for the monitor to pinpoint exactly which individual component was faulty if the test fails. Furthermore, due to internal redundancy, the same path test may sometimes succeed and sometimes fail simply because the test request may take different paths through the system. On the other hand, component monitoring can be achieved via "ping" queries initiated by the monitoring system, or via periodic "I'm alive" messages sent by the software components. Although component monitors can be able to pinpoint a faulty component precisely, they might not test functional behavior and might miss non-fail-silent failures in the components. Certain exemplary embodiments can comprise a ps command adapted to monitor a web server process.

In certain exemplary embodiments, monitors can be adapted to test relatively low Open Systems Interconnection (OSI) Reference Model levels such as whether an information device is operational or not and/or whether a first information device is communicatively coupled to a second information device, etc. Certain monitors can be adapted to perform tests on information devices at relatively high OSI reference model levels such as whether a database server can provide a correct reply to a test query, and/or whether an mail server is able to send and/or receive email messages, etc. Certain monitors can be adapted to test a service provided by a plurality of information devices. Certain monitors can be adapted to test a multi-step process and/or service, such as whether a travel web site is able to provide a listing of flights between a first location and a second location and whether an information device associated with the travel web site is adapted to send an email confirmation to a client booking a flight, etc.

Once a failure has been detected and diagnosed, operators choose from a number of available recovery actions that can comprise restarting of components or hosts, starting of additional copies of certain components (masking), reconfiguration of software, or physical repair of system hardware. Automatic choice of recovery actions can be based on a fuzzy (and sometimes conflicting) picture of the system painted by monitors. Thus, the automatic choice of recovery actions can be a challenging task that can impact availability.

Figure 2:
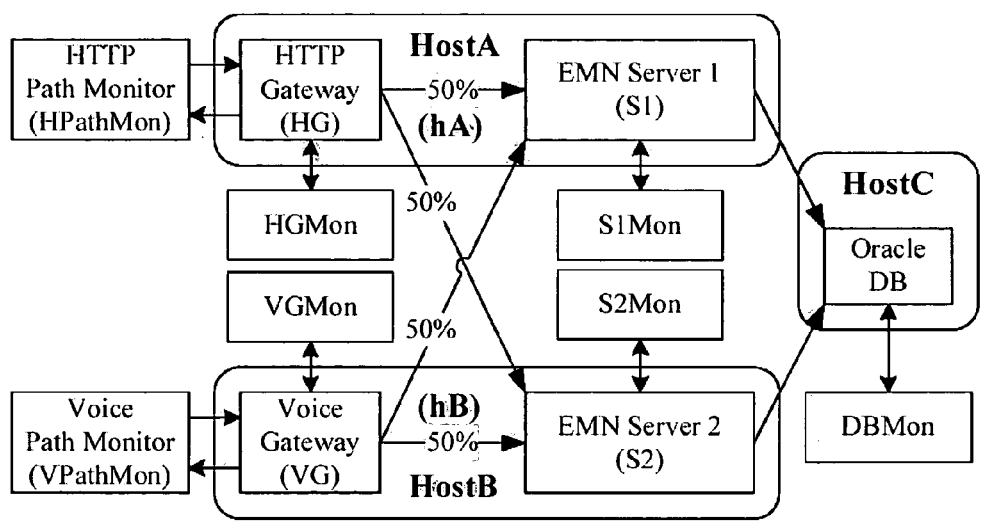
FIG. 2 is an exemplary configuration of EMN 2000.

FIG. 2 is an exemplary configuration of an EMN 2000. EMN 2000 can implement a Company Object Lookup (CoOL) system for a sales organization. The CoOL system can be adapted for on-the-road salespeople to look-up (and update) current inventory levels, pricing, and sales records, etc., such as via the company's website (through the HTTP Gateway) or via phone (through the Voice Gateway). In addition to protocol gateways, the system can comprise duplicated back-end EMN servers and a database. Components of EMN 2000 can be housed on three physical hosts, HostA, HostB, and HostC. The gateways can use round robin routing to forward incoming requests to one of the two EMN servers, which then look-up and update the relevant data from the database and send a response back through the same gateway.

The system can be considered similar to many commercial three-tier e-commerce/web services that comprise a web server, an application server, and/or a back-end database, etc. Additionally, because of their simplicity, component and path monitors can be utilized in real e-commerce applications. Designing path monitors to provide good coverage without being intrusive can be an important objective. Certain exemplary embodiments can utilize existing path monitors that can be present in many systems irrespective of how they were designed. Even though restarts and reboots alone cannot recover from all possible problems in a system, they are common actions employed by system operators, and can be effective against temporary and transient failures that form a large fraction of operational problems in modern systems. Exemplary recovery algorithms can be generic and can thus be applied to other recovery methods.

In certain exemplary embodiments, a goal can be to diagnose system problems using the output of available monitors and choose the recovery actions that can be most likely to restore the system to a proper state at a low and/or minimum cost.

Figure 3:
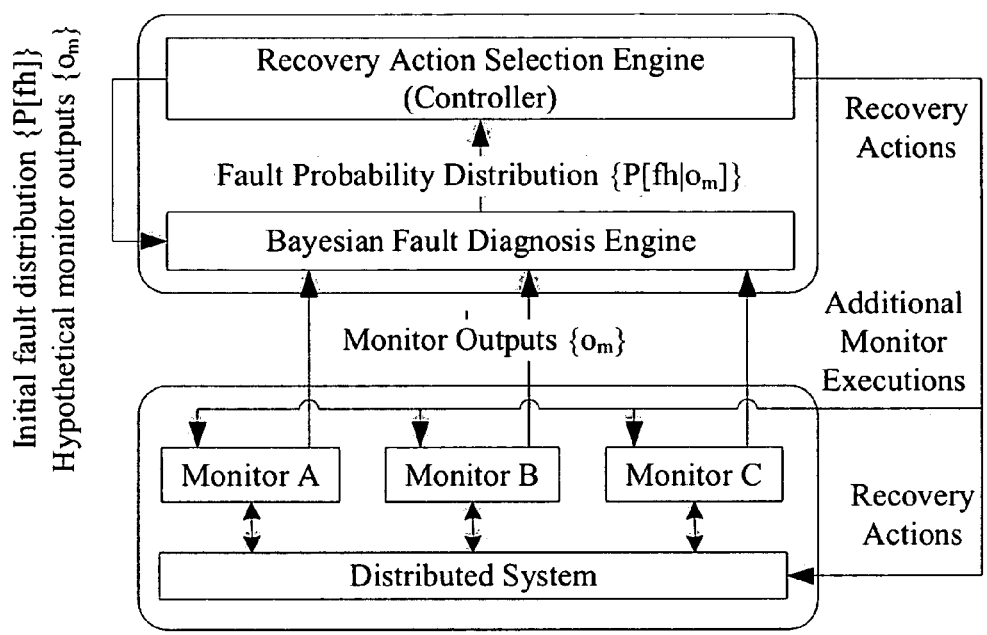
FIG. 3 is a runtime architecture 3000 for a "recovery controller"

FIG. 3 is a runtime architecture 3000 for a "recovery controller." In certain exemplary embodiments, to combat individual monitor limitations, a recovery controller can be adapted to combine monitor outputs in order to obtain a unified and more precise probabilistic picture of system state. Remaining uncertainties in system state can be at least partially resolved by injecting recovery actions and observing their effects.

Certain exemplary embodiments can comprise determining which combinations of component faults can occur in the system in a short window of time. Each fault combination can be characterized by a "fault hypothesis" (e.g., "Server 1 has crashed"). In certain exemplary embodiments, a "coverage" of each monitor can be specified with regard to each fault hypothesis fh, i.e., the probability that a monitor m will report a failure if fh is true. In certain exemplary embodiments, the effects of each recovery action can be specified according to how it modifies the system state and fault hypothesis (e.g., restart can convert a system characterized by a "temporary fault" hypothesis into a system characterizable by a "no fault" hypothesis).

During runtime, if the monitors detect a failure, the recovery controller can be invoked. The controller can operate in a series of steps. Each step can comprise a complete monitor-decide-act cycle where the monitors can be executed, their outputs can be combined, and a recovery action can be chosen and executed. The controller can utilize Bayesian estimation to combine monitor outputs and determine the likelihood that each fault hypotheses is true. To do so, the controller can be adapted to utilize coverage models, historical component behavior, and monitor outputs. The controller can be adapted to invoke a recovery algorithm to choose appropriate recovery action(s). Certain exemplary embodiments comprise two possible and distinct recovery algorithms: SSLRecover and MSLRecover. SSLRecover (Single Step Lookahead) can be a computationally efficient greedy procedure that attempts to choose a minimum cost recovery action that can result in a system recovery from a fault associated with a most likely fault hypothesis. MLSRecover (Multi-Step Lookahead) can be a more sophisticated algorithm that looks multiple steps into the future and can attempt optimization over entire sequences of recovery actions. MLSRecover can be adapted to decide when additional monitoring is needed. The algorithm for MLSRecover can be based on partially observable Markov decision processes (POMDPs).

During its operation, the recovery controller can be adapted to maintain (probabilistic) information about the presence of faults in the system through a set of "fault hypotheses" FH. A fault hypothesis fh∈FH is simply a Boolean expression that, when true, can indicate the presence of one or more faults inside the system. The semantics of fault hypotheses can be application-specific, and might not be exposed to the recovery algorithm (except through the monitors and recovery actions described below). For example, in the CoOL system, the fault hypothesis Crash(HG) can represent the condition where the HTTP Gateway component has crashed but all the other hosts and components are operational, while the fault hypothesis Crash(HG, DB) can indicate that both the HTTP Gateway and the database have crashed.

Sometimes, hidden inter-component dependencies and fault propagation can cause cascading failures in distributed systems. In certain exemplary embodiments, the controller can be adapted to deal with such situations after the cascading has occurred. It can be possible to model such failures just like other multi-component failures (e.g., common mode failures) using composite fault hypotheses. Conversely, a single component may have multiple fault hypotheses, each corresponding to a different failure mode. In addition to user-specified fault hypotheses, the recovery controller maintains a special null fault hypothesis, $fh_\phi$, that indicates that no faults are present in the system. Certain exemplary embodiments can assume that only one fault hypothesis can be true at a time.

An exemplary system can comprise a set of monitors M that test the functionality of the system (or some subset of it) and/or the validity of various fault hypotheses. A monitor can return true if it detects a fault, and false otherwise. Given that a certain fault hypothesis is true, each monitor's output can be independent both from other monitors' output and from other output of its own, if it's invoked multiple times. When one or more monitors detect a fault, the recovery controller can be invoked to repair the system. The controller might not need to know how the monitors work, but can be adapted to determine what the monitors' output signifies in terms of which fault hypotheses they cover. The coverage can be specified in terms of monitor coverage P[m|fh], that is, the probability that monitor m∈M will return true if the fault hypothesis fh∈FH is true. If the coverage of a particular monitor for a particular fault hypothesis is not provided, it can be assumed to be 0. Note that false positives for monitor m can be specified simply as the probability that the monitor reports true when the null fault hypothesis $fh_\phi$ is true, that is, $P[m|fh_\phi]$.

In certain exemplary embodiments, the system can provide some recovery actions a∈A that can be used to restore the state of failed hosts and components. In general, a recovery action can be characterized by its mean execution time (or cost in general), the conditions in which it is applicable, and finally the effect it has on the system. Multiple recovery actions can be applicable at the same time, and the controller can be adapted to pick the best one. Descriptions of actions can differ with the specific control algorithm used. Additionally, recovery actions can be application-specific.

The recovery controller can be adapted to treat fault hypotheses as opaque, and might not associate any semantics with them apart from their interaction with monitors and recovery actions. Therefore, certain exemplary embodiments can define fault hypotheses based on available monitoring and recovery actions (e.g., "fail-silent failure in component c that can be fixed by restarting"). Doing so can ensure that recovery actions can succeed without reducing the power of the recovery controller. In certain exemplary embodiments, the controller can detect (and alert an operator about) faults inconsistent with the monitor coverage specifications or not fixable by defined recovery actions whether a fault hypothesis is defined for the faults or not.

The CoOL system can comprise one fault mode for hosts, Down, and two fault modes for components, Crash and Zombie. Down(h) implies that host h has crashed (and does not respond to monitoring tests), but rebooting the host will fix the problem. Crash(c) means that component c has crashed, and Zombie(c) means that component c can be alive and responds to pings, but cannot otherwise perform its intended function. Thus, in this embodiment, Zombie faults are not fail-silent, and therefore might not be detected by ping-based component monitors. However, path-based monitors can be adapted to work by comparing the result obtained in response to a test request with a golden value and can thus detect such non-fail-silent behaviors. In both cases, restarting the component can restore its functionality.

TABLE 1

Partial monitor coverage

| Monitor | D(hA) | C(HG) | Z(HG) | C(VG) | Z(VG) | C(S1) | Z(S1) | Z(DB) | C(S1,S2) | Z(S1,S2) | $fh_\phi$ |
|---|---|---|---|---|---|---|---|---|---|---|---|
| HPathMon | 1 | 1 | 1 | 0 | 0 | 0.5 | 0.5 | 1 | 1 | 1 | 0 |
| VPathMon | 0.5 | 1 | 0 | 1 | 1 | 0.5 | 0.5 | 1 | 1 | 1 | 0 |
| HGMon | 1 | 1 | 0 | 0 | 0 | 0 | 0 | 0 | 0 | 0 | 0 |
| VGMon | 0 | 0 | 0 | 1 | 0 | 0 | 0 | 0 | 0 | 0 | 0 |
| S1Mon | 1 | 0 | 0 | 0 | 0 | 1 | 0 | 0 | 1 | 0 | 0 |
| S2Mon | 0 | 0 | 0 | 0 | 0 | 0 | 0 | 0 | 1 | 0 | 0 |
| DBMon | 0 | 0 | 0 | 0 | 0 | 0 | 0 | 0 | 0 | 0 | 0 |

The system can comprise five component monitors (HGMon, VGMon, S1Mon, S2Mon, and DBMon), and two path monitors (HPathMon and VPathMon) through the HTTP and Voice gateways respectively. Table 1 shows the monitor coverage for a subset of the fault hypotheses. Down(h) is abbreviated as D(h), Crash(c) as C(c), and Zombie(c) as Z(c). Because the coverage of a monitor for a fault hypothesis that it cannot detect is 0 and most monitors detect only a small subset of the faults, the table is sparsely populated. In reality, timeouts that are too short also affect the coverage of component monitors (by making it less than 1) and introduce false positives, but Table 1 ignores such details with the comment that they can be easily incorporated by using network measurements in coverage estimation. In order to compute the coverage for the path monitors automatically, a Markov chain induced by the request flow-graph can be utilized. Round-robin load balancing can be represented by probabilistic transitions in the Markov chain. Because of load balancing, none of the monitors can differentiate between zombie faults in the two exemplary EMN servers of the CoOL system.

For the CoOL system, a c.restart( ) action can be adapted to allow recovery from both C(c) and Z(c) faults by restarting component c and causing the system to reinitialize a system state from stable storage. An h.reboot( ) action can be adapted to allow recovery from D(h) faults by rebooting host h. For the CoOL example, all three types of fault hypotheses are assumed to be temporary, and thus can always be fixed by restarting/rebooting. Although we do not do so for the CoOL example, recovery actions such as migration (i.e., restart a component on another host) can be easily added to the system (and modeled) to mask permanent faults.

When one or more monitors report a fault, the controller can determine a most likely candidate fault hypothesis using Bayesian estimation. Certain exemplary embodiments provide a uniform treatment of multiple types of realistic system monitors (e.g., path monitors) with differing characteristics. Certain exemplary embodiments couple diagnosis and recovery in an algorithm.

In the following discussion, let $o_m$ denote the current output of monitor m∈D, let FH be the set of possible fault hypotheses, and let P[fh] be the a priori probability that fh is true. If the controller has no prior knowledge about the likelihoods of the different fault hypotheses being true, it can assume they are equally likely and set $P[fh] \leftarrow ([1/(|FH|)])$, ∀fh∈FH. The probabilities can then be updated based on the outputs of the monitors and the monitor coverage specifications (P[d|fh]) using the Bayes rule as follows.

$$P[fh|\{o_M\}] = \frac{P[\{o_M\}|fh]P[fh]}{\sum_{fh' \in FH} P[\{o_M\}|fh']P[fh']} \quad (1)$$

where $$P[\{o_m|fh\}] = \prod_{m \in M} 1[o_m]P[m|fh] + 1[\neg o_m](1 - P[m|fh]) \quad (2)$$

and where 1 [expr] is the indicator function, and is 1 if expr is true, and 0 otherwise. Equation 2 can be a result of the monitor independence assumption. If the original hypothesis probability (P[fh]) is 0, then so is the updated hypothesis probability. This property can be called the zero preservation property. Hence, if a fault hypothesis is known to be false (either using external knowledge, or because a recovery action that recovers from that fault was executed earlier), then the initial hypothesis probability can be set to 0 without fear of it becoming non-zero after one or more Bayesian updates.

For the CoOL example, assume that the HTTP Gateway goes into a zombie state. Hence, HPathMon reports true, but VPathMon and all the component monitors report false. After the first Bayesian update, all D(h) and C(c) fault hypotheses are eliminated because of the false outputs of all the component monitors, and the Z(DB) and Z(VG) hypotheses are eliminated because the output of the VPathMon is false. Therefore, the only remaining possibilities are Z(HG), Z(S1), or Z(S2). Because $P[O_M|Z(HG)]=1$ and $P[O_M|Z(S1)]=P[O_M|Z(S2)]=0.25$, therefore $P[Z(HG)]=0.6667$ and $P[Z(S1)]=P[Z(S2)]=0.1667$ after the Bayesian update. Note that a similar result could have occurred if either Z(S1) or Z(S2) were true. However, another round of testing (resulting again in HPathMon returning true and VPathMon returning false) would cause the Bayesian update to update the probabilities to $P[Z(HG)]=0.8889$ and $P[Z(S1)]=P[Z(S2)]=0.0557$, lending credibility to the Z(HG) hypothesis. On the other hand, if Z(S1) or Z(S2) was true, HPathMon would return false at least once, and Z(HG) would be eliminated, resulting in P[Z(S1)]=P[Z(S2)]=0.5.

In cases where all monitor coverage values (and thus the right hand side of Equation 2) can be binary (0 or 1), the Bayesian update in Equation 1 can become "equality preserving", i.e. if two hypotheses have equal initial probabilities, they have equal updated probabilities. Equality preservation can make it difficult to choose between competing fault hypotheses, and thus result in inefficient recovery. However, in many cases, it can be possible to overcome the problem if different fault hypotheses occur at different rates. In these cases, the recovery controller can keep track of fault hypotheses occurrence rates, and use them to compute initial estimates for $\{P[fh]\}$. Thus, if faults hypotheses are assumed to occur according to a Poisson arrival process and hypothesis fh occurs at a rate $\lambda_{fh}$, then $P[fh]=\lambda_{fh}/\Sigma_{fh' \in FH}\lambda_{fh'}$. Values of $\lambda_{fh}$ can be updated by the controller at runtime by noting when a fault occurred (i.e. the time the controller was invoked), the action a that caused the system to recover, and updating the rates of those fault hypotheses that action a recovers from.

Once the probability for each fault hypothesis has been computed by the Bayesian update, recovery can be attempted. In certain exemplary embodiments, SSLRecover can choose a least expensive recovery action that can recover from a most likely fault hypothesis. The algorithm might only look one recovery action into the future while making its decision. SSLRecover can be used when individual recovery actions are complete in themselves, that is, each recovery action can recover from some fault hypothesis without the help of other recovery actions, and the order in which recovery actions are applied does not affect their outcomes. For the purposes of the algorithm, each recovery action $a \in A$ is specified using two parameters: $a.FaultSet \in 2^{FH}$, which can be the set of fault hypotheses from which the action can recover, and $a.cost \in \Re^+$, which can be the cost to complete the recovery operation. For example, an h.reboot( ) action, can recover from both host crashes (D(h)) and component failures of all the components residing on h. The cost of an action can be measured in any units applicable, for example, execution time of the recovery action.

Algorithm 1: Single Step Lookahead Recovery Algorithm

```
SSLRecover({P[fh]},FH,D,A,e,maxtests) {
  while (true) {
    for i=1 to maxtests {
      for each m∈M do o_m←ExecuteTest(m)
      for each fh∈FH do {
        P[fh]_old←P[fh]; P[fh]←Bayes(P[fh],{o_m})}
      if (not exists fh∈FH, s.t. P[fh]>e) return(error);
      if (P[fh_φ]≧1−e) return(success);
      if (max_fh∈FH|P[fh]−P[fh]_old|<e) break;
    }
    maxHyp←fh∈FH s.t. P[fh]=max{P[h]:h∈(FH−fh_φ)};
    PosAct←a∈A s.t. (maxHyp∩a.FaultSet≠φ);
    Action←a∈PosAct s.t. a.cost=min{a'.cost: (a'∈PosAct)};
    ExecuteAction(Action);
    foreach fh∈Action.FaultSet do {
      P[fh_φ]←P[fh_φ]+P[fh]; P[fh]←0;
    }
  }
}
```

Code embodying the single-step recovery process can be as shown in Algorithm 1. When a monitor detects a problem, the algorithm can be invoked with an initial probability distribution on the set of fault hypotheses. Once invoked, the algorithm can execute monitors and updates the probabilities of the hypotheses using Bayesian update (equation 1). The algorithm can repeat the process a predetermined number, max-tests, times, or until a predetermined condition occurs. For example, if the probabilities of all the fault hypotheses approach zero can be indicative that a fault has occurred that can be detected by the monitors, but might not be included in a utilized fault hypothesis set. If the probability of the null fault hypothesis approaches 1 (within $\epsilon$), the algorithm can consider recovery to be a success and terminate. Successful termination can mean that the fault was recovered with an arbitrarily high confidence (tunable by choice of $\epsilon$). If the fault hypotheses probabilities do not change by more than a specified tolerance value ($\epsilon$), it might be unnecessary to repeat the iteration again and the algorithm can move to choosing the recovery action. The repeated invocation of the monitors and the Bayesian estimation can be advantageous because the monitors may have imperfect fault coverage (monitor coverage <1) and thus can return different answers at different times: for example, the HPathMon monitor in the CoOL example might detect the failure of a single EMN server only half the time. In general, the lower the coverage of the monitors for a particular fault, the higher the value of maxsteps might be to diagnose the fault accurately the first time. If the monitors can be completely deterministic, a value of 1 can be enough. However, the value of maxtests might not be significant for the safety and termination of the algorithm, and a value that might be too low might only cause unneeded recovery actions to be executed, and at worst might call the SSLRecover procedure multiple times.

After the monitor and Bayesian update iterations, the algorithm can select the set of most likely hypotheses and chooses a lowest-cost recovery action that can recover from at least one of the most likely hypotheses. Once the chosen recovery action has been carried out, the probabilities of all the fault hypotheses in Action.FaultSet can be set to zero, and the probability of a null fault hypothesis can be correspondingly increased. The entire process can be repeated until the probability of the null fault hypothesis increases to the specified threshold (1−$\epsilon$), or the algorithm encounters a fault from which it cannot recover. The algorithm can be adapted to terminate in a finite number of steps either successfully or with an alert to the operator. If the algorithm quits with an operator alert, it can mean either that the fault hypotheses were insufficient to capture the fault that has actually occurred, or that some recovery actions were unsuccessful in recovering from the fault.

For the CoOL example, if Z(S1) has occurred, and that HPathMon has returned true, but all the other monitors have returned false. If maxtests 1, the Bayesian update results in P[Z(HG)]=0.6667, and P[Z(S1)]=P[Z(S2)]=0.1667. Therefore, MaxFh will include only Z(HG), and HG.restart( ) will be chosen as the cheapest action that would recover from P[Z(HG)]. Consequently, the hypotheses' probabilities would be updated to P[fh_φ]=0.6667, and P[Z(S1)]= P[Z(S2)]=0.1667. However, a future round of monitor execution and Bayesian update might result in VPathMon returning true and HPathMon returning false, which would make fh_φ invalid and cause P[Z(S1)]=P[Z(S2)]=0.5. In a worst case, if S2.restart( ) was chosen as the next action, the fault hypotheses' probabilities would become P[fh_φ]=0.5, and P[Z(S1)]=0.5 after action execution. Another round of monitoring and application of the Bayesian update might cause HPathMon to return true and VPathMon to return false, thus invalidating fh_φ and causing P[fh_φ]=0, and P[Z(S1)]=1. This would result in S1.restart( ) being chosen, and subsequently allow SSLRecover to terminate successfully. The diagnosis of Z(S1) or Z(S2) represents the worst possible scenario for the controller, because the provided path monitors are not capable of differentiating between the two. Nevertheless, the algorithm eventually chooses the correct action and terminates successfully.

In general, the algorithm SSLRecover can be characterized by a theorem:

if there exists at least one recovery action for every fault hypothesis, then algorithm SSLRecover always terminates in a finite number of steps either successfully, or with an operator alert. Furthermore, if the algorithm models a fault in the set of fault hypotheses FH and monitor definitions D, the algorithm exits successfully. Otherwise, the algorithm terminates with an operator alert.

For proving termination in a finite number of steps, according to the zero preserving property of the Bayesian update rule, once $P[fh]=0$ for some $fh \in FH$, then it can never become non-zero again via a subsequent Bayesian update step. If $P[fh]=0, \forall fh \in FH$, then the algorithm can exist via an operator alert. If $fh_\phi$ is the only non-zero element, then its $P[fh_\phi]=1$, and the algorithm can exit successfully. Otherwise, there can exist at least one non-zero maximally probable fault hypotheses fh. At least one action can exist that recovers from fault fh, and a lowest-cost action can exist for fh. After the lowest cost action is executed, $P[fh]$ can be set to 0. Hence, in a single iteration of the outer loop, either the algorithm exits, or $P[fh]=0$ for some fh for which $P[fh] \neq 0$. Since a number of fault hypotheses is finite, the algorithm terminates in a finite number of steps.

To show successful termination of SSLRecover when a correctly modeled fault occurs, it is sufficient to observe that the fault will always be chosen as part of the set MaxHyp during some iteration of the outer loop unless one of the following two conditions are true: 1) the algorithm exits successfully prior to choosing fh (proving the successful termination property), or $P[fh]=0$. However, $P[fh]=0$ only if either the fault has not occurred or it can be modeled incorrectly by the definition of $P[m|fh]$ for some $m \in M$. Both these statements contradict the assumptions of the theorem, showing that the second part of the theorem is true by contradiction. Proof of termination with an operator alert (for incorrect or missing fault models) follows as a consequence of the first two parts.

The SSLRecover algorithm can be characterized as computationally efficient and can comprise provable termination properties, but can comprise some inherent limitations. First, the SSLRecover procedure can utilize a greedy action selection criterion. However, several cost metrics of practical importance (e.g., down time and number of recovery actions) can depend on the entire sequence of recovery actions. In some systems, the greedy approach used by SSLRecover may not be able to minimize such metrics. Examples of such systems include those in which some actions do not recover from any faults by themselves, but enable other recovery actions or provide more information (e.g., a monitor invocation). Finally, the applicability of some actions and their effects might depend on the state of the system, something that is not modeled by certain embodiments of the SSLRecover algorithm. An algorithm called MSLRecover can be adapted to overcome certain limitations of the SSLRecover procedure. MSLRecover can be based on a Partially Observable Markov Decision Process (POMDP) construction that evaluates sequences of future recovery actions before choosing an action. MSLRecover can be adapted to support multi-step, state-dependent actions and cost metrics defined over an entire recovery process.

The MSLRecover algorithm can comprise a state-based model of a target system, fault hypotheses, and recovery actions that can be defined using the following elements.

System States. The set of system states Scan be defined using a set of state-variables SV. Each state in S is a unique assignment of values to each state-variable. System states are assumed to be fully observable.

Fault Hypothesis States. Fault hypotheses can be encoded in a single state variable whose value reflects the fault hypothesis currently present in the system. However, because this state variable might not be fully observable, its value is represented by a probability distribution over the fault hypotheses $\{P[fh]\}$ Model-State. The model-state can be a tuple (s,fh) that comprises both system and fault hypothesis state. However, due to the partial observability, the model state can be represented probabilistically as (s, $\{P[fh]\}$).

Recovery Actions. Each action in the action set A can be represented by a precondition, a state effect, and a fault hypothesis effect. The precondition a.pre(s) is a Boolean-valued predicate that returns true for those system states in which an action, a, from action set A is allowed and false otherwise. The state effect a.sEffect(s)→S specifies how action a modifies the system state, while the fault hypothesis effect a.fhEffect(s,fh)→FH specifies how a transforms the fault hypothesis state (e.g., transforms some fh into the null fault hypothesis).

Cost Metric. The cost metric can defined on a per-step basis (where the word "step" refers to a single action executed by the controller). Cost can be defined using a rate cost that is accrued continuously at a rate $c_r(s,a,fh)$ and an impulse cost $c_i(s,a,fh)$ that is accrued instantaneously when the controller chooses action a in model-state (s,fh). With these definitions, the single-step cost is computed as $\hat{c}(s,a,fh)=c_i(s,a,fh)+c_r(s,a,fh)\cdot\{a.\bar{t}(s,fh)+\text{monitor}.\bar{t}\}$ where $a.\bar{t}(s,fh)$ is the time taken to execute action a, and monitor. $\bar{t}$ is the time taken to execute the monitors. Costs can be negative to model reward or profit.

For the CoOL system, the state includes the current set of hosts H, components C, monitors M, and partition components (h)→$2^c$ that specify the set of components running on each host. Making these definitions a part of the state allows recovery actions to change them (e.g., enable/disable hosts, monitors, or components). There are two classes of actions, c.restart and h.reboot, and a third "dummy" monitor-only action mon. All actions are always enabled (the pre predicate always returns true), and they do not have any state effects (sEffect is the identity function). The function fhEffect for the mon action is an identity function, while for c.restart it transforms the C(c) and Z(c) fault hypotheses to $fh_\phi$. For the h.reboot action, fhEffect transforms D(h), C(c), Z(c) $\forall c \in$ components(h) to $fh_\phi$. In an attempt to reduce a number of user requests denied due to failure, the rate cost (assuming an equal mix of voice and HTTP requests) is defined as $c_r(s,a,fh):=1[fh \in \{d(hC),c(DB),z(Db)\}]$ $+0.5\cdot1[fh \in \{c(S1),c(S2), z(S1),z(S2),c(HG),z(HG),c(VG),z(VG)\}]$ $+0.25\cdot1[fh \in \{d(hA),d(hB)\}]$. This definition can specify that the fraction of missed requests is 1 if the database or its host is down, 0.5 if either Gateway is down (due to the workload mix), 0.5 if either EMN server is down (due to the load balancing), and 0.25 if HostA or HostB is down (because multiple components are affected).

$$V(s, \{P[fh]\}) = \qquad (3)$$

$$\min_{\substack{a \in A \\ a.pre(s)}} \sum_{fh \in FH} P[fh] \left\{ \hat{c}(s, a, fh) + \sum_{o_M \in O_{fh}} P[o_M|s, a, fh] V( \right.$$

$$\left. a.sEffect(s), Bayes(\{P[fh|s, a]\}, o_M)) \right\}$$

Selecting a recovery action can be cast in terms of model elements. Let $(S_\tau, \{P[fh]\}_\tau)$, $A_\tau$, and $fh_\tau$ denote the (random) model-state, chosen recovery action, and correct fault hypothesis during a particular step t of the recovery controller. If T is the total number of steps needed for recovery, the goal of the MSLRecover algorithm is to choose a sequence of actions $a_1, \ldots, a_T$ such that the average one-step cost summed over the entire recovery process $$E\left[\sum_{t=1}^{T} \hat{c}(S_t, A_t, fh_t)\right]$$

is minimized. Let $V(s, \{P[fh]\})$ represent this minimum cost if the system starts in model-state $(s, \{P[fh]\})$; the determined cost can be denoted as a mincost of that model-state. If the problem is cast in the POMDP framework with a total-cost criterion, the mincost for all states can be computed as a solution of a Bellman dynamic programming recursion. Equation 3 gives this recursion adapted for the system model described above. Note that equation 3 differs from traditional POMDPs in that some states (system states) are fully observable, but others (fault hypothesis states) are not. This separation reduces the effective state-space size and allows preconditions based on system-state without invalidating any optimality guarantees.

Figure 4:
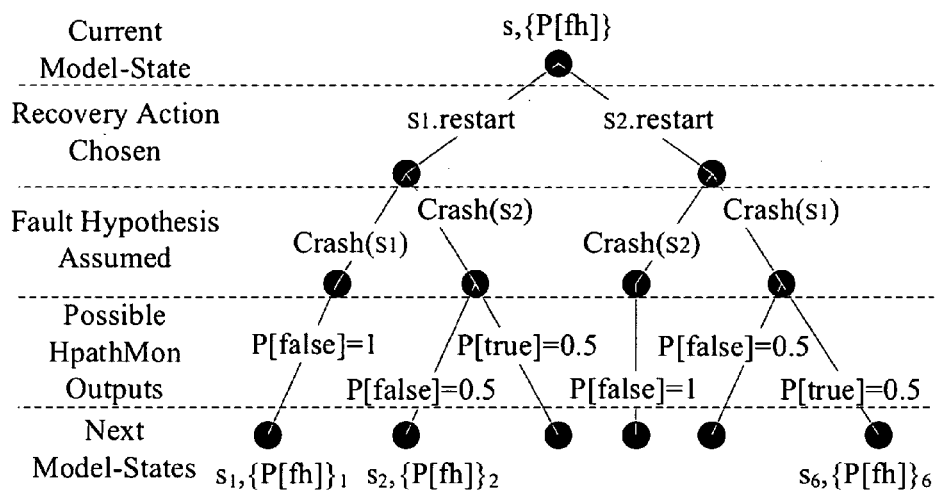
FIG. 4 is a state diagram 4000.

FIG. 4 is a state diagram 4000, which shows one level of expansion of the recursion of Equation 3 with only two fault hypotheses (i.e., Crash(S1) and Crash(S2)) in the context of the CoOL system. Equation 3 can be understood via a sample single-step of the recursion tree as shown in FIG. 4. For each possible combination of fault-hypothesis fh and chosen recovery action a, the equation considers the possible next model-states the system can transition into. It does so by computing the set $O_{fh}$ of possible monitor output combinations that could possibly be generated after action a was executed with fh present in the system. For each such possible monitor output combination $O_M$, the next system-state is just a.sEffect(s,fh). To compute the next fault hypothesis state corresponding to $O_M$, we first compute how execution of action a affects the fault hypothesis probabilities, using the following equation:

$$P[fh|s, a] = \sum_{fh' \in FH} P[fh'] 1[a.fhEffect(s, a, fh') = fh] \qquad (4)$$

Then, simply calling the Bayesian update from Equation 1 with P[fh|s,a] and $O_M$ as inputs results in the next fault hypothesis state. The corresponding transition probability is the probability that monitor outputs $O_M$ are generated after action a is executed with fh in the system. This probability is given by (with $P[O_M|fh]$ computed using Equation 2):

$$P[o_M|s, a, fh] = P[o_M|fh' \leftarrow a.fhEffect(s, fh)] \qquad (5)$$

The mincost of a state if action a is executed with fault hypothesis fh in the system can be given by the sum of the single-step cost and the expected value of the mincost of the next model-state (computed as a weighted sum over the set of next states). Averaging over FH can result in the mincost that results from choosing action a. The action that minimizes the mincost can be the action chosen. FIG. 4 shows this process in the context of the CoOL system with only two fault hypotheses (i.e., Crash(S1) and Crash(S2)). The two recovery actions being considered are S1.restart( ) and S2.restart( ). If a correct action is chosen, then the only possible monitor output can be false. However, if an incorrect action is chosen, the monitor can detect the fault only with probability 0.5 (its coverage), and two outputs are possible.

One issue with Equation 3 can be the size of set $O_{fh}$. In a worst case, a number of possible monitor output combinations is exponential in the number of monitors. However, in practice, that is usually not a problem, because if a monitor either does not detect a fault hypothesis at all, or detects it with certainty (coverage 1), it has a single output for that fault hypothesis, and does not cause addition of elements to $O_{fh}$. In most practical systems, that is what happens since most monitors either detect only a few fault hypotheses or detect their targeted faults with certainty.

An overall operation of the MSLRecover algorithm can be characterized as similar to that of SSLRecover (See FIG. 4) except for a couple of differences. As a first example, in choosing the next action, MSLRecover can Equation 3 and choose an action that maximizes the right side of that equation. As a second example, unlike in the SSLRecover algorithm, monitors might only be invoked once before a recover action is chosen. In certain exemplary embodiments, monitoring actions can be added as explicit recovery actions, allowing the solution of Equation 3 to choose them explicitly only when better diagnosis is needed. Because of the similarity to the SSLRecover algorithm, the proof of termination in a finite number of steps can also hold for MSLRecover if every action recovers from at least one fault hypothesis. However, actions allowed by MSLRecover are more general, and that condition might not always hold.

If Equation 3 is solved exactly for the choice of the best action, the recovery can be optimal. However, because the model-state space is infinite (all the possible values of $\{P[fh]\}$), the recursion can be difficult to solve. Solutions can be found more easily by sacrificing provable optimality and expanding the recursion only up to a finite depth maxdepth (or until a state is reached where the system has recovered and $P[fh_\phi] > 1-\epsilon$). Thus, in certain exemplary embodiments, a finite number of values of $\{P[fh]\}$ are utilized in obtaining the solution. However, when the recursion is terminated because the maximum depth was reached, a heuristic can be used to represent the remaining cost of recovery at the point of termination.

The value of the heuristic can have an effect on the efficiency of the recovery actions generated by the algorithm. A possible heuristic, which provides good results can be represented by the equation:

$$V(s, \{P[fh]\}) = (1 - P[fh_\phi]) \cdot \max_{a \in A} a.\bar{t} \qquad (6)$$

This heuristic can be adapted to penalize actions that do not move probability mass to $fh_\phi$. In certain exemplary embodiments, another heuristic can be utilized, which favors short recovery sequences (in the number of actions) by assigning a constant large cost to every V(s, {P[fh]}). However, this heuristic caused the algorithm to behave aggressively by picking expensive recovery actions that ensured recovery within less than the lookahead horizon (maxdepth). This behavior can prevent the algorithm from outperforming SSLRecover.

Certain exemplary embodiments can be implemented in C++ code as part of a toolbox for model-driven adaptation and recovery. The SSLRecover algorithm can utilize specifications, in a simple textual language, of fault hypotheses, monitors (including coverage probabilities), and simple descriptions of recovery actions. However, when using the MSLRecover algorithm, the user can provide a description of a relevant system state, but the reward and recovery action specifications (e.g., the pre, fhEffect, sEffect, and t̄ functions) can be complex. The implementation can be adapted to allow the user to specify the state, action, and reward specifications using arbitrary C++ code embedded in a higher-level model description language. The specifications can be provided to a parser that can convert them into C++ code, that when compiled together with the recovery algorithm library, can provide an implementation of the recovery controller. For deployment in a system, the controller can be adapted to accept callbacks to be implemented to execute recovery actions and system monitors.

Although the controller algorithms could be demonstrated on a real EMN deployment, for the purposes of obtaining experimental results, certain exemplary embodiments can utilize a simulation. For example, a simulation harness can be utilized that interfaces with the real controller but simulates the rest of the system to provide the controllers with stimuli similar to those that would be generated in an actual EMN deployment. The simulator can be adapted to inject faults into the system using a Poisson arrival process with a specified rate $\lambda_f$, with each fault type being equally likely. When the system monitors detect the fault, the recovery algorithm can be invoked. Monitors can be invoked once every minute (i.e., faults are not always detected instantaneously), and take 5 seconds to execute. The recovery and monitoring actions generated by the recovery algorithms can be simulated. However, the recovery algorithm might not be simulated, but instead can run the implementation in real time.

The CoOL system was used for the experiments. The only fault hypotheses that were considered were Crash and Zombie for each of the 5 components, and Down for each of the 3 hosts, for a total of 13 fault hypotheses. The system included one component monitor for each component and two path monitors (one each for HTTP and Voice testing), for a total of 7 monitors. Finally, a Restart action for each component, a Reboot action for each host, and an explicit Test action (for the MSLRecover algorithm only) were assumed for a total of 9 actions. The Reboot actions were assumed to take a time of 5 minutes regardless of which host was being rebooted, while the restart actions took varying amounts of time between 1 minute (for the HTTP gateway) and 4 minutes (for the DB), depending on the component being restarted. A total of 80% of the site traffic was assumed to be HTTP traffic, while 20% was assumed to be Voice traffic.

Four different configurations were considered: the SSLRecover algorithm with the number of tests to invoke before choosing a recovery action (maxtests) set to 1 or 2, and the MSLRecover algorithm with maximum lookahead depth (maxdepth) set to 2 or 3. Finally, the simulations ran using a "Recovery Oracle." In the recovery oracle runs, the recovery algorithm can be assumed to have perfect knowledge of what fault has occurred, and hence can always choose the best recovery action (as predetermined by a human). In reality, implementing a recovery oracle is not possible, because some fault types (e.g., Zombie faults in the CoOL system) cannot be localized perfectly in one (or sometimes even more) rounds of testing. Hence, either additional monitoring can be needed or incorrect recovery actions will have to be tolerated, both of which affect recovery time. Nevertheless, the oracle represents the best possible performance any algorithm could have given the types of faults and recovery actions available to the system, and serves as a good benchmark for comparison.

The experiments were conducted on hosts with Athlon XP 2400 processors. For each simulation run, the system was run for a total time (simulated+real) of 10 days. A total of 100 runs were performed for each configuration. Availability of the system in a simulation run was computed by integrating a fractional point measure that specified what fraction of system requests could be satisfied at each instant of time and dividing by the length of the interval. Therefore, multiplying the availability measure by a (constant) system request rate would return the total number of user requests satisfied. Even though the recovery algorithms support multiple (explicitly specified) faults in the system at one time, fault injections were limited to only one fault at a time for ease in determining the best Oracle recovery policy (which was done by hand). Each of the five configurations was tested in two different scenarios. In one, all thirteen types of faults were injected (Crash or Zombie in each component, and Down in each host), and in the other, only Zombie faults were injected (although the recovery algorithms did not know that). Zombie faults were considered separately because they cannot be detected with good localization (since only the path monitors can detect them), and thus provide a challenge to the recovery algorithms.

Figure 5:
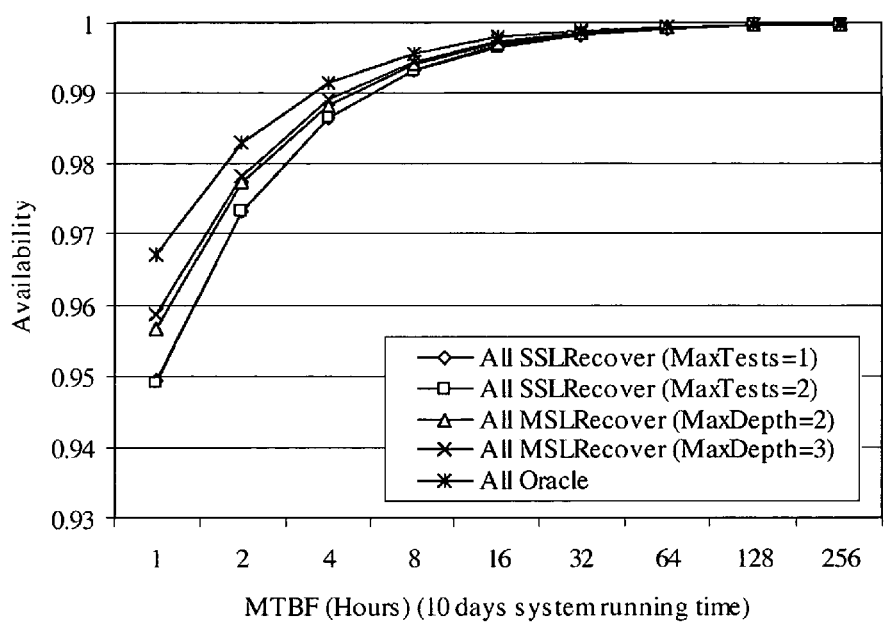
FIG. 5 is a graph 5000 related to recovery performance.

FIG. 5 is a graph 5000 showing the availability of the system as a function of the MTBF when all types of faults were injected.

| Algorithm (Zombie Faults) | Faults | Cost | Down Time (sec) | Residual Time (sec) | Algorithm Time (sec) | Actions | Monitor Calls |
|---|---|---|---|---|---|---|---|
| SSLRecover (maxtests = 1) | 44160 | 229.58 | 389.28 | 220.98 | 0.0001065 | 3.000 | 4.13 |
| SSLRecover (maxtests = 2) | 44334 | 222.41 | 381.93 | 214.38 | 0.0000162 | 2.901 | 6.938 |
| MSLRecover (maxdepth = 2) | 44726 | 186.44 | 323.40 | 203.64 | 0.03355 | 2.554 | 4.260 |
| MSLRecover (maxdepth = 3) | 44939 | 161.94 | 274.13 | 181.00 | 0.4896 | 2.130 | 4.837 |
| Oracle | n/a | 84.40 | 132.00 | n/a | n/a | 1.000 | 0.000 |

Figure 6:
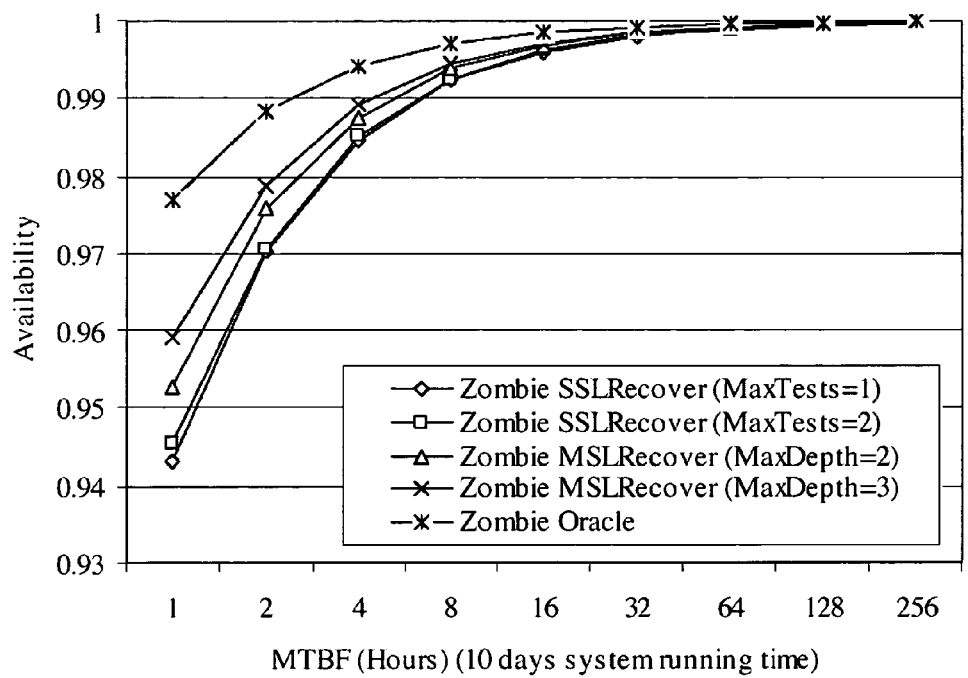
FIG. 6 is a graph 6000 related to recovery performance.

FIG. 6 is a graph 6000 showing the availability of the system as a function of the MTBF when Zombie component failures that were injected.

System availability can remain more or less the same as the value of maxtests is increased for the SSLRecover algorithm, but increases as the value of maxdepth is increased for MSLRecover. Moreover, the system availability using the MSLRecover algorithm can be better than the availability using the SSLRecover, and this difference can be more pronounced for zombie-only faults. Recovery processes for Zombie faults, unlike crash and down faults, can comprise multiple steps. Thus, a further lookahead can be of greater benefit. Although the algorithms fare reasonably well with respect to the Oracle benchmark, there appears to still be room for improvement. Moreover, the difference appears more pronounced for zombie faults due to their poor diagnosability.

or maxdepth (for MSLRecover) can increase the efficiency of the respective algorithms (fewer average actions per fault). However, the MSLRecover algorithm can gain a larger benefit from a lesser increase in the number of monitoring actions. Reasons for this can be related to both an ability of MSLRecover algorithm to initiate additional testing only when needed, and a longer lookahead that gives it the ability to better see the future benefits of additional testing. In contrast, increasing maxtests for SSLRecover increases the testing for all types of faults, even when it may not be needed (e.g., for the easily diagnosable Crash and Down faults).

SSLRecover can have a shorter execution time, because of its polynomial complexity (with respect to the number of fault hypotheses and actions). Nevertheless, provided that the lookahead for MSLRecover can be kept small, both algorithms can be fast enough for real systems.

TABLE 2

Fault Injection Results (Values are Per-fault Averages)

| Algorithm (All Faults) | Faults | Cost | Down Time (sec) | Residual Time (sec) | Algorithm Time (sec) | Actions | Monitor Calls |
|---|---|---|---|---|---|---|---|
| SSLRecover (maxtests = 1) | 44902 | 199.79 | 290.68 | 226.33 | 0.0000803 | 1.837 | 2.89 |
| SSLRecover (maxtests = 2) | 45398 | 199.61 | 291.69 | 227.02 | 0.0001146 | 1.802 | 4.653 |
| MSLRecover (maxdepth = 2) | 45451 | 169.50 | 251.87 | 205.82 | 0.01318 | 1.590 | 2.868 |
| MSLRecover (maxdepth = 3) | 45616 | 160.56 | 233.59 | 197.68 | 0.2210 | 1.428 | 3.079 |
| Oracle | n/a | 124.15 | 179.77 | n/a | n/a | 1.000 | 0.000 |

Detailed measurements of the algorithms in are presented in Table 2. In addition to indicating the total number of faults injected for each configuration, the table specifies many per-fault metrics. The cost metric specifies the cost of recovery per fault (system execution time_(1–availability)/number of faults). The metric essentially weighs the down time for each component by the importance of the component. The down time metric represents the unweighed amount of time (per fault) when some component in the system can be unavailable either because of a fault, or because the recovery algorithm can be restarting or rebooting it. The residual time metric specifies the average amount of time a fault remains in the system. The algorithm time represents the time (wall-clock) spent in executing the MSLRecover and SSLRecover algorithms (i.e., not including the cost of monitoring and repair actions). The actions and monitor calls entries can be the average number of recovery actions and test actions executed by the recovery algorithms per fault recovery.

Several observations can be made from Table 2. First, the fault residual time can be actually smaller than the down time because of zombie faults that have poor diagnosability. Even after a fault has been recovered from, the controller does not know for sure that the fault was really fixed (due to the probabilistic nature of the monitors). Therefore, the controller may still execute additional recovery actions so as to bring the probability of the null fault hypothesis ($fh_\phi$) to within the target of $1-\epsilon$ ($\epsilon$ was set to 0.001). Increasing the value of epsilon can reduce the down time and cost of recovery, but it could also increase the likelihood that the algorithm will return while the fault is still present in the system.

A second observation can be related to the average number of actions vs. the number of monitor calls for the two algorithms. Increasing the maxtests parameter (for SSLRecover)

Certain exemplary embodiments do not assume that monitors themselves are faulty. Instead, complexity can arise from having monitors of different types comprising those that can test more than one component (e.g. the path monitors), and provide incomplete fault coverage. In certain exemplary embodiments, due to limited monitor coverage, attempts can be made to assure that correct components or hosts are acted upon. Certain exemplary embodiments attempt to optimize a recovery process given the amount of information available. Furthermore, certain exemplary embodiments consider systems that may have multiple repair actions and multiple optimization criteria to drive recovery.

In certain exemplary embodiments, repair decisions can be made dynamically at runtime, a tactic that can provide two benefits. First, because repair policies do not have to be pre-computed and stored, much larger state spaces can be accommodated. Second, the system can continue to update information about failure rates and use it to make better decisions as time progresses. Certain exemplary embodiments comprise non-deterministic monitor outputs that can allow repair decisions to be made based on state other than the previous test outputs.

Certain exemplary embodiments comprise a holistic approach for automating the recovery of practical distributed systems even with incomplete information about what faults may have occurred in the system. Two different algorithms, SSLRecover and MSLRecover can be used, which can use Bayesian estimation to probabilistically diagnose faults and use the results to generate recovery actions. The algorithms can be complementary in their strengths. While SSLRecover can be computationally efficient and can comprise provable termination properties, MSLRecover can express complex recovery actions, perform more efficient recovery, and attempt to optimize user-specified metrics during recovery, but can be more expensive computationally. Finally, the performance of each algorithm was compared with a theoretically optimal (but unrealizable) Oracle via extensive fault injections, and showed that while both algorithms performed reasonably well compared to the optimum, the performance of MSLRecover was superior due to a longer lookahead. However, both algorithms can be practical, and as part of a low-cost, high-availability solution, can provide benefits to a large number of practical distributed systems.

Figure 7:
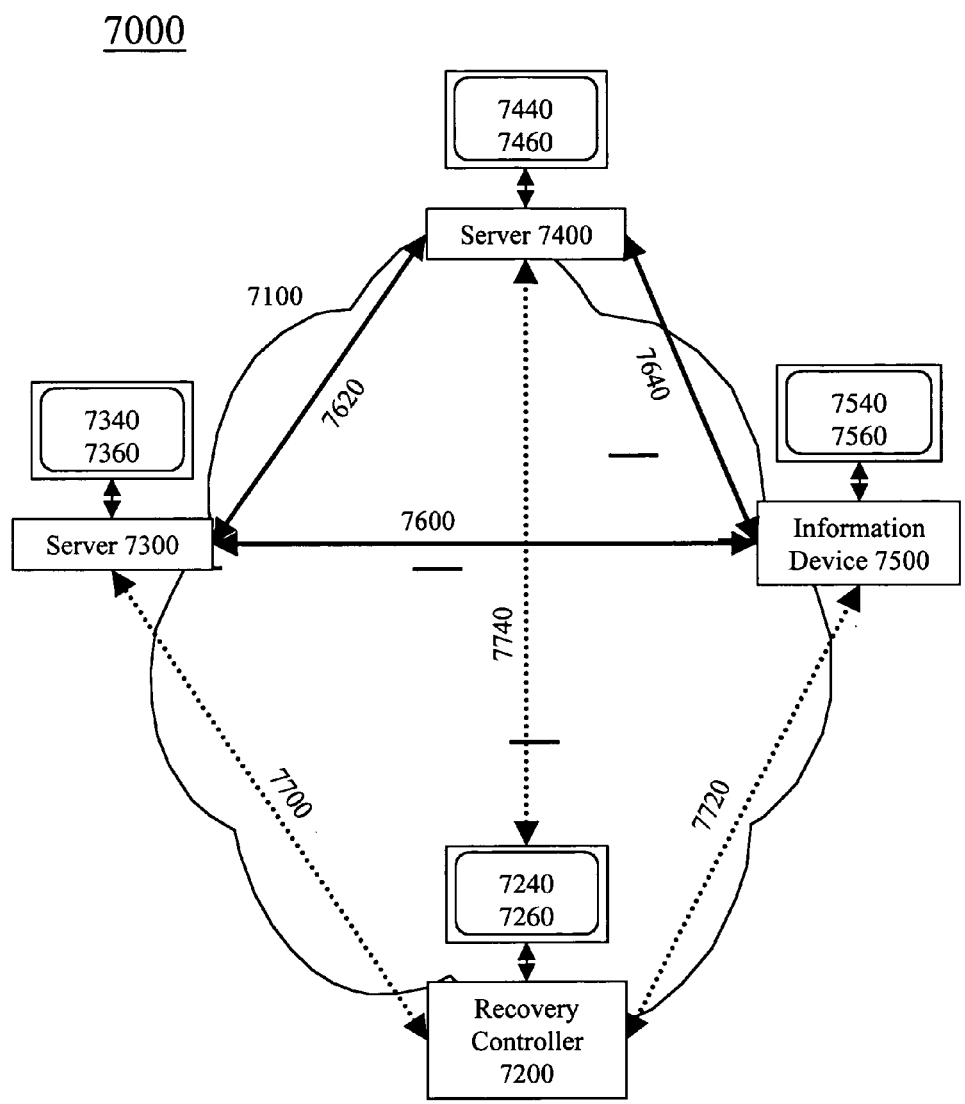
FIG. 7 is a block diagram of an exemplary embodiment of a system 7000.

FIG. 7 is a block diagram of an exemplary embodiment of a system 7000, which can comprise a network 7100. In certain exemplary embodiments, network 7100 can be a public, private, circuit-switched, packet-switched, virtual, radio, telephone, cellular, cable, DSL, satellite, microwave, AC power, twisted pair, ethernet, token ring, LAN, WAN, Internet, intranet, wireless, Wi-Fi, BlueTooth, Airport, 802.11a, 802.11b, 802.11g, and/or any equivalents thereof, etc., network. In certain exemplary embodiments, devices communicatively coupled to network 7100 can comprise cell phones, pagers, faxes, personal computers, firewalls, load balancers, routers, switches, servers, database servers, JMS servers, email servers, VoiceGenie servers, EMN gateways of different kinds, and/or EMN servers, etc.

Network 7100 can comprise a plurality of communicatively coupled information devices. For example, network 7100, which can be a backbone network, can comprise and/or communicatively couple any of a recovery controller 7200, server 7300, server 7400, and information device 7500.

Recovery controller 7200 can comprise a user interface 7240 and a user program 7260. User program 7260 can be adapted to provide instructions adapted to detect a fault and automatically initiate a recovery action responsive to the fault. For example, user program 7260 can be adapted to calculate a Bayesian probability to determine a most likely hypothesis of the nature of the fault. Responsive to the determination of the most likely hypothesis of the fault, user program 7260 can be adapted to automatically initiate a single step or a multiple step recovery action.

Recovery controller 7200 can be communicatively coupled to server 7300 via a logical link 7700. Recovery controller 7200 can be communicatively coupled to server 7400 via a logical link 7740. Recovery controller 7200 can be communicatively coupled to information device 7500 via a logical link 7720.

In an exemplary embodiment, server 7300 can comprise a user interface 7340 and a user program 7360. User program 7360 can be adapted to provide a service that can be utilized by other devices on network 7100.

Information device 7500, which can comprise a user interface 7540 and user program 7560, can be adapted to utilize the service running on server 7300. Information device 7500 can be communicatively coupled to server 7300 via a logical link 7600.

Server 7300 can be communicatively coupled to a server 7400 via a logical link 7620. Server 7400 can comprise a user interface 7440 and a user program 7460. User program 7460 can be adapted to provide the service in the event of a fault associated with server 7300. Server 7400 can be communicatively coupled to information device 7500 via a logical link 7640.

User program 7260 can comprise a plurality of device and/or path monitors adapted to detect a fault related to the service. A path monitor can issue a request, similar to a possible user request, to one or more devices communicatively coupled via network 7100. The processing of the user request can involve multiple components communicatively coupled via network 7100. The path monitor might not know an actual path taken by the request. The path monitor can be adapted to test a communicative coupling between devices separated by a plurality of links and/or devices. For example, server 7300 and server 7400 may employ replicated services. The path monitor might not know which one of the servers will serve a particular request. If the request completes successfully, the path monitor can determine that the system is capable of serving such requests. If the request fails, the path monitor can determine that at least one component in network 7100 has failed.

For example, a travel web site can be adapted to provide a user interface that can allows a user to book tickets to a flight. The travel web site can comprise multiple internal components (such as firewalls, web servers, load balances, and/or databases, etc.). For this embodiment a "user request" used by a monitor can comprise a request to a service interface provided by travel web site and can be similar to real user request. For example, a monitor monitoring a travel web site might request a listing of flights from Newark to Chicago.

Responsive to outputs associated with the plurality of monitors, user program 7260 can be adapted to determine a most likely fault via determination of a plurality of Bayesian probabilities. Each of the plurality of Bayesian probabilities can be associated with a particular fault. A most likely fault can be determined by finding a fault with a highest probability of the plurality of Bayesian probabilities. For example, user program 7260 can be adapted to determine a fault associated with the service.

Responsive to a determination of the fault with the service, recovery controller 7200 can select one of a plurality of recovery actions. For example, recovery controller 7200 can be adapted to provide instructions to server 7300 to stop and restart the service. In certain exemplary embodiments, recovery controller 7200 can be adapted to provide instructions adapted to reboot server 7300. In certain exemplary embodiments, recovery controller 7200 can be adapted to start the service on server 7400 and instruct information device 7400 to access the service on server 7400 via logical link 7640.

Recovery controller 7200 can be adapted to select one or more of the plurality of recovery actions via evaluating costs associated with the recovery actions. Recovery controller 7200 can be adapted to seek one or more of the plurality of recovery actions that will result in a lowest estimated overall cost.

Figure 8:
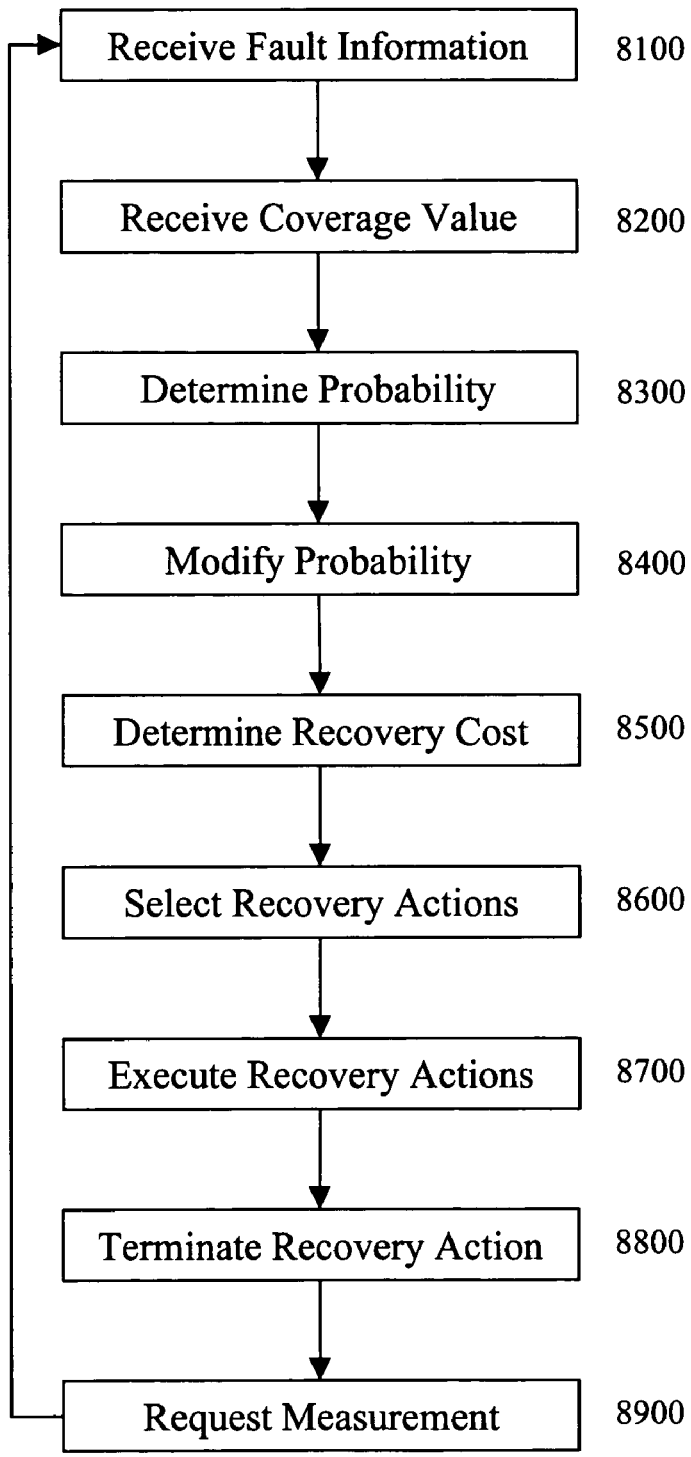
FIG. 8 is a flowchart of an exemplary embodiment of a method 8000.

FIG. 8 is a flowchart of an exemplary embodiment of a method 8000. At activity 8100, fault information can be received at a recovery controller. In certain exemplary embodiments, activities comprised in method 8000 can be undertaken by a single recovery controller. In certain exemplary embodiments, activities comprised in method 8000 can be undertaken by a plurality of recovery controllers. Fault information can be received from one or more monitors associated with a network. Monitors can be adapted to determine a status of a particular device. For example, a monitor can be adapted to determine a status of an information device communicatively coupled to the network. The monitor can send a signal via the network requesting a response. A received response from the information device can be indicative of a communicatively coupled status. On the other hand, a lack of response can be indicative of a failed device and/or network link.

Monitors can be adapted to determine a status of a network path. For example, a monitor can be adapted to determine a status of a plurality of links adapted to communicatively couple a plurality of network nodes. In certain exemplary embodiments, the recovery controller can be adapted to receive information indicative of a fault from the monitor associated with the network path. In certain exemplary embodiments, the monitor can be one of a plurality of monitors.

At activity 8200, a coverage value can be received at the recovery controller. Fault coverage values can be indicative of a probability that a particular monitor can detect a particular fault in the network. The particular fault can occur when a machine crashes, process dies, and/or web server process hangs, etc.

For example, a predetermined monitor can be adapted to detect a link failure of a monitored link with near certainty. Thus, in certain exemplary embodiments, a fault coverage value for the predetermined monitor for detecting the link failure can be assigned a value of approximately one. On the other hand, the predetermined monitor might generally be unable to detect a failure of a database query engine on a web server if the web server remains responsive to a request for a response from the predetermined monitor, as a result a fault coverage value for the predetermined monitor associated with the failure of the database query engine might be assigned a value approximately equal to zero. In certain exemplary embodiments, the recovery controller can be adapted to receive a fault coverage value associated with a monitor such as the predetermined monitor.

At activity 8300, a probability associated with a fault hypothesis can be determined by the recovery controller. The probability associated with the fault hypothesis can be determined responsive to the information indicative of the fault. In certain exemplary embodiments, the recovery controller can automatically determine a Bayesian probability of the fault hypothesis. The fault hypothesis can be one of a plurality of fault hypotheses.

For example, the Bayesian probability of the fault hypothesis can be calculated via an equation:

$$Bayes(\{P[fh]\}, \{o_M\}) :=$$

$$P[fh|\{o_M, \forall m \in M\}] = \frac{P[\{o_M, \forall m \in M\}|fh]P[fh]}{\sum_{fh' \in FH} P[\{o_M, \forall m \in M\}|fh']P[fh']}$$

where:

$$P[\{o_M, \forall m \in M\}|fh] = \prod_{m \in M} 1[o_m]P[m|fh] + 1[\neg o_m](1 - P[m|fh]);$$

fh is a hypothesized fault of a set of possible fault hypotheses FH;
P denotes a determinable probability;
P[fh] denotes a prior estimate of a probability of fh being true;
m is a monitor of a set of monitors M;
$o_m$ denotes an output of monitor m;
$o_M$ denotes an output of a set of monitors M; and
1 [expression] is an indicator function, and is 1 if [expression] is true, and 0 otherwise.

At activity 8400, the probability associated with the fault hypothesis can be modified by the recovery controller. The recovery controller can be adapted to change behavior based upon past results from monitoring the network and/or responding to faults therein. For example, the recovery controller can be adapted to change a response to a fault based upon a successful and/or an unsuccessful response to a prior fault. Thus, the recovery controller can be adapted to modify the Bayesian probability of the fault hypothesis based upon historical network and/or component behavior.

At activity 8500, a recovery cost associated with a recovery action can be determined by the recovery controller. In certain exemplary embodiments, the recovery controller can be adapted to receive a defined cost associated with the recovery action from a communicatively coupled information device, entity, and/or user. The recovery action can be determined responsive to a determination of a most probable fault hypothesis of the plurality of fault hypotheses. The recovery cost can be based upon a time expected for the recovery action to be completed and/or an estimated time during which a particular device and/or service will be down if the recovery action is selected and executed. In certain exemplary embodiments, the recovery controller can be adapted to automatically initiate a single step minimum cost recovery action to correct the fault.

In certain exemplary embodiments, the recovery action can be determined via a recursively-determined, substantially optimal, multiple-step recovery action. In certain exemplary embodiments, the recursively-determined, substantially optimal, multiple-step recovery action can comprise a partially observable Markov decision process. Each step of the multiple-step recovery action can be associated with a cost. In certain exemplary embodiments, selecting the multiple-step recovery action can involve determining a plurality of steps projected to result in a minimum cost of recovery from the fault. In certain exemplary embodiments, the recursive determination of the substantially optimal, multiple-step recovery action comprises making an attempt to minimize a cost function. The cost function can comprise a rate cost component and an impulse cost component. The recursively-determined, substantially optimal, multiple-step recovery action can involve evaluating an equation:

$$V(s, \{P[fh]\}) = \min_{\substack{a \in A \\ a.pre(s)}} \sum_{fh \in FH} P[fh] \left\{ \hat{c}(s, a, fh) + \sum_{o_M \in O_{fh}} P[o_M|s, a, fh]V(a.sEffect(s), Bayes(\{P[fh|s, a]\}, o_M)) \right\}$$

where:
V(s,{P[fh]}) is a lowest calculated cost for a sequence of recovery actions for a system starting in a state (s,{P[fh]});
fh is a hypothesized fault of a set of possible fault hypotheses FH;
P denotes a probability;
a is a recovery action of a set of possible recovery actions A;
s is a system state of a possible set of system states S;
s.pre(s) is a Boolean-valued predicate that returns true for system states in which a is allowed and false otherwise;
a single step cost is defined by
$\hat{c}(s,a,fh)=c_i(s,a,fh)+c_r(s,a,fh)\cdot\{a.\bar{t}(s,fh)+monitor.\bar{t}\}$;
$c_r(s,a,fh)$ is a rate cost;
$c_i(s,a,fh)$ is an impulse cost when a controller chooses a recovery action, a, in state s given fault hypothesis fh is true;
$a.\bar{t}(s,fh)$ is a time taken to execute recovery action a in system state s given fault hypothesis fh is true;
monitor. $\bar{t}$ is a time taken to execute monitors;

m is a monitor of a set of monitors M;

$o_M$ denotes an output of a set of monitors M;

$O_{fh}$ denotes possible monitor output combinations that could possibly be generated after a recovery action a is executed with a fault fh present in a system;

a.sEffect(s) is a predicted system state following action a in state s; and

Bayes denotes a Bayesian formula where:

$$P[fh|s, a] = \sum_{fh' \in FH} P[fh']1[a.fhEffect(s, a, fh') = fh]$$

a.fhEffect(s,fh') is a resulting fault hypothesis when action a is taken in state s when fault hypothesis fh' is true; and $$P[o_m|s,a,fh] = P[o_m|fh' \leftarrow a.fhEffect(s,fh)].$$

Determining, via a recursive determination, the substantially optimal, multiple-step recovery action can comprise evaluating an expression adapted to compute a next fault hypothesis state corresponding to a particular set of outputs from the plurality of monitors. The next fault hypotheses state can be determined based upon how a particular recovery action affects fault hypothesis probabilities. In certain exemplary embodiments, the next fault hypothesis state can be calculated via an equation:

$$P[fh|s, a] = \sum_{fh' \in FH} P[fh']1[a.fhEffect(s, a, fh') = fh]$$

where:

fh is a hypothesized fault of a set of possible fault hypotheses FH;

P denotes a determinable probability;

a is a recovery action of a set of possible recovery actions A;

s is a system state of a possible set of system states S; and a.fhEffect(s,a,fh') is a resulting fault hypothesis when action a is taken in state s when fault hypothesis fh' is true; and 1 [expression] is an indicator function, and is 1 if [expression] is true, and 0 otherwise.

Determining a preferred recovery action utilizing the recursive determination of the substantially optimal, multiple-step recovery action can comprise evaluating the equation:

$$P[o_M|s, a, fh] = P[o_M|fh' \leftarrow a.fhEffect(s, fh)] = \prod_{m \in M} 1[o_m]P[m|fh'] + 1[\neg o_m](1 - P[m|fh'])$$

where:

m is a monitor of a set of monitors M;

$o_M$ denotes an output of a set of monitors M;

fh is a hypothesized fault of a set of possible fault hypotheses FH;

P denotes a determinable probability;

a is a recovery action of a set of possible recovery actions A;

s is a system state of a possible set of system states S;

a.fhEffect(s,fh') is a resulting fault hypothesis when action a is taken in state s when fault hypothesis fh' is true; and 1 [expression] is an indicator function, and is 1 if [expression] is true, and 0 otherwise.

In certain exemplary embodiments, a heuristic value can be calculated to indicate a remaining cost of recovery. Certain exemplary embodiments can terminate recursions in the recursive determination of the substantially optimal, multiple-step recovery action after a predetermined number of recursions. If cost estimates from the recursive determination of the substantially optimal, multiple-step recovery action are not complete when the recursive determination is terminated, certain exemplary embodiments can estimate the remaining cost of recovery, such as via an equation:

$$V(s,\{P[fh]\}) = (1 - P[fh_\phi]) \cdot \max_{a \in A} a.\bar{t}$$

where:

$V(s,\{P|fh|\})$ is a minimum cost for a sequence of recovery action for a system starting in a state $(s,\{P[fh]\})$;

fh is a hypothesized fault of a set of possible fault hypotheses FH;

P denotes a probability;

$fh_\phi$ is a null hypothesis denoting a hypothesis that a system is fault free;

a is a recovery action of a set of possible recovery actions A;

s is a system state of a possible set of system states S; and $a.\bar{t}$ is a time taken to execute recovery action a.

At activity 8600, a recovery action can be selected by the recovery controller. The recovery action can be responsive to a determination of a most probable fault hypothesis of the plurality of fault hypotheses. Certain exemplary embodiments can comprise an automatically initiation, by the recovery controller, of the recovery action to correct the fault. In certain exemplary embodiments, the recovery action can be the recursively-determined, substantially optimal, multiple-step recovery action.

In certain exemplary embodiments, the recovery action can comprise restarting a service. In certain exemplary embodiments, the recovery action can comprise rebooting an information device. In certain exemplary embodiments, the recovery action can comprise starting a service on an information device. For example, if a service fails that has been running on a first information device, the recovery controller can be adapted to stop the service on the first information device and start the service on a distinct second information device. The recovery controller can then point other information devices utilizing the service to the second information device. As another example, the recovery action can comprise stopping and/or restarting a sub-routine, process, search, script, and/or macro, etc. can be halted, without necessarily stopping a related and/or underlying service.

At activity 8700, the recovery action can be executed. The recovery action can be executed responsive to initiation instructions from the recovery controller.

At activity 8800, the recovery action can be terminated. The recovery action can be terminated responsive to instructions from the recovery controller. In certain exemplary embodiments, a recursive recovery action can be terminated after a predetermined number of recursions. After a predetermined number of attempts to automatically correct the fault, the recovery controller can alert a system operator regarding the fault.

At activity 8900, a measurement can be requested from one or more of the plurality of sensors. For example, the recovery controller can be adapted to request the measurement to determine whether the recovery action succeeded. The measurement can be utilized to modify heuristics that can affect future recovery actions selected responsive to future detected faults by the recovery controller.

Figure 9:
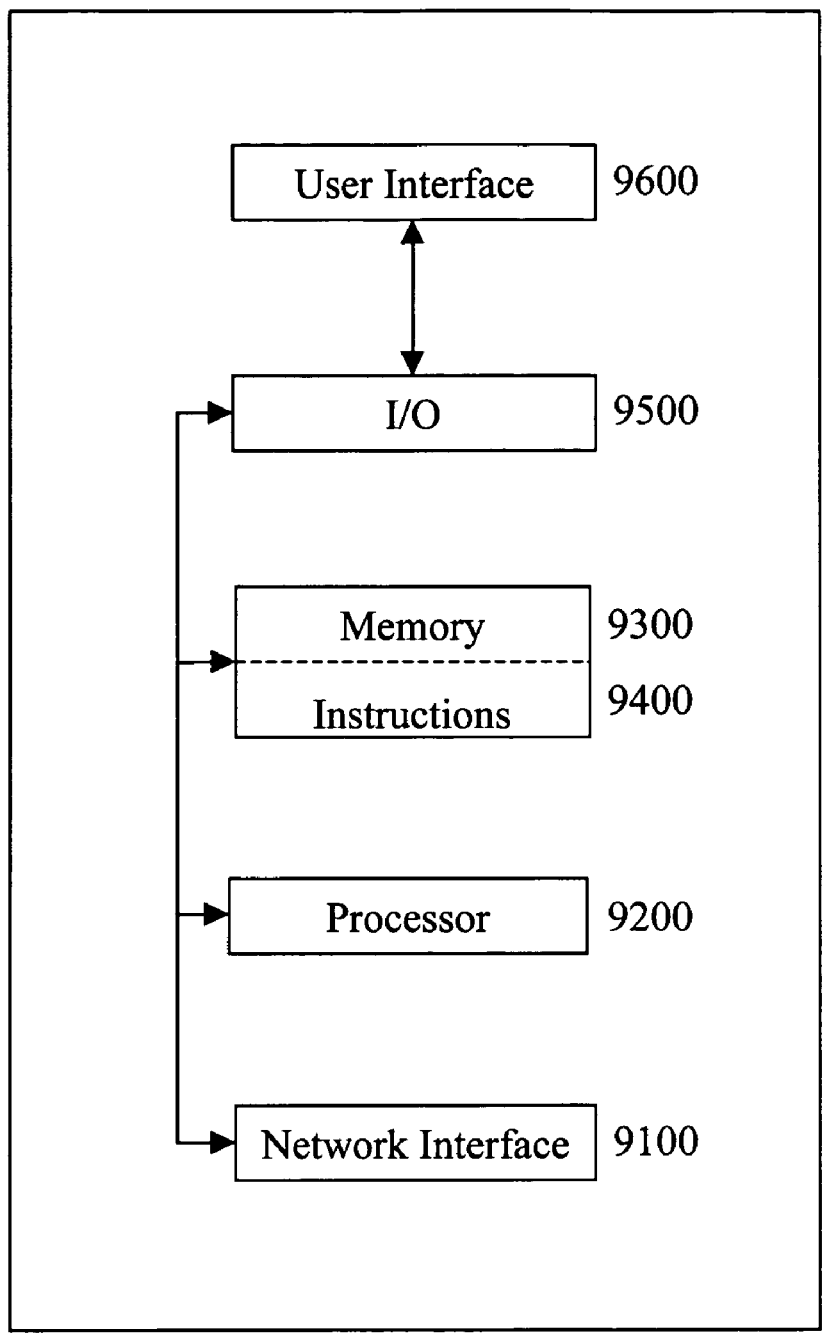
FIG. 9 is a block diagram of an exemplary embodiment of an information device 9000.

FIG. 9 is a block diagram of an exemplary embodiment of an information device 9000, which in certain operative embodiments can comprise, for example, recovery controller 7200, server 7300, server 7400, and information device 7500 of FIG. 7. Information device 9000 can comprise any of numerous well-known components, such as for example, one or more network interfaces 9100, one or more processors 9200, one or more memories 9300 containing instructions 9400, one or more input/output (I/O) devices 9500, and/or one or more user interfaces 9600 coupled to I/O device 9500, etc.

In certain exemplary embodiments, via one or more user interfaces 9600, such as a graphical user interface, a user can view a rendering of information related to monitoring network conditions, determining a probability of a fault hypothesis, and/or automatically initiating a recovery action related to the fault hypothesis.

Still other practical and useful embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

- there is no requirement for the inclusion of any particular described or illustrated characteristic, function, activity, or element, any particular sequence of activities, or any particular interrelationship of elements;
- any elements can be integrated, segregated, and/or duplicated;
- any activity can be repeated, any activity can be performed by multiple entities, and/or any activity can be performed in multiple jurisdictions; and
- any activity or element can be specifically excluded, the sequence of activities can vary, and/or the interrelationship of elements can vary.

Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A method comprising:
   receiving information indicative of a fault from a monitor, the monitor one of a plurality of monitors;
   responsive to the information indicative of the fault, automatically determining a probability of a fault hypothesis, the fault hypothesis one of a plurality of fault hypotheses, the probability determined based upon outputs of all of the plurality of monitors; and
   responsive to a determination of a most probable fault hypothesis of the plurality of fault hypotheses, automatically initiating a recursively-determined, substantially optimal, multiple-step recovery action to correct the fault, each step of the multiple-step recovery action associated with a cost, the most probable fault hypothesis determined responsive to an automatically modified value, the recursively-determined, substantially optimal, multiple-step recovery action determined based upon historical performance of the multiple-step recovery action;
   wherein the recursively-determined, substantially optimal, multiple-step recovery action is selected based upon a solution of a partially observable Markov decision process.

2. The method of claim 1, wherein the probability of each fault hypothesis is calculated using a Bayesian formula.

3. The method of claim 2, wherein the probability of each fault hypothesis is calculated via an equation:

$$Bayes(\{P[fh]\}, \{o_M\}) :=$$

$$P[fh|\{o_M, \forall m \in M\}] = \frac{P[\{o_M, \forall m \in M\}|fh]P[fh]}{\sum_{fh' \in FH} P[\{o_M, \forall m \in M\}|fh']P[fh']}$$

where:

$$P[\{o_M, \forall m \in M\}|fh] = \prod_{m \in M} 1[o_m]P[m|fh] + 1[\neg o_m](1 - P[m|fh])$$

fh is a hypothesized fault of a set of possible fault hypotheses FH;
P denotes a determinable probability;
P[fh] denotes a prior estimate of a probability of fh being true;
m is a monitor of a set of monitors M;
$o_m$ denotes an output of monitor m;
$o_M$ denotes an output of a set of monitors M; and
1 [expression] is an indicator function, and is 1 if [expression] is true, and 0 otherwise.

4. The method of claim 1, further comprising:
   identifying a plurality of identified fault coverage values, each monitor of the plurality of monitors associated with a distinct fault coverage value for each fault hypothesis of the plurality of fault hypotheses, the plurality of identified fault coverage values adapted for use in said activity determining the probability of the fault hypothesis.

5. The method of claim 1, wherein the probability of the fault hypothesis is based upon a plurality of identified fault coverage values, each monitor of the plurality of monitors associated with a distinct fault coverage value for each fault hypothesis of the plurality of fault hypotheses.

6. The method of claim 1, further comprising:

identifying a plurality of identified fault coverage values, each monitor of the plurality of monitors associated with a distinct fault coverage value for each fault hypothesis of the plurality of fault hypotheses, the plurality of identified fault coverage values adapted for use in said activity determining the probability of the fault hypothesis; and automatically modifying a fault coverage value of the plurality of fault coverage values responsive to an outcome of the partially observable Marlcov decision process.

7. The method of claim 1, further comprising:

modifying the probability of the fault hypothesis based upon automatically modified rules, the automatically modified rules determined based upon historical component behavior, the historical component behavior learned responsive to a prior recursively-determined, substantially optimal, multiple-step recovery action.

8. The method of claim 1, further comprising:

receiving a defined cost associated with the recursively-determined, substantially optimal, multiple-step recovery action.

9. The method of claim 1, wherein the recursively-determined, substantially optimal, multiple-step recovery action comprises evaluating an expression:

$$V(s, \{P[fh]\}) = \min_{\substack{a \in A \\ a.pre(s)}} \sum_{fh \in FH} P[fh] \Bigg\{ \hat{c}(s, a, fh) + \sum_{o_M \in O_{fh}} P[o_M|s, a, fh] V(a.sEffect(s), Bayes(\{P[fh|s, a]\}, o_M)) \Bigg\}$$

where:

V(s, {P[fh]}) is a lowest calculated cost for a sequence of recovery actions for a system starting in a state (s,{P[fh]});

fh is a hypothesized fault of a set of possible fault hypotheses FH;

P denotes a probability;

a is a recovery action of a set of possible recovery actions A;

s is a system state of a possible set of system states S;

s.pre(s) is a Boolean-valued predicate that returns true for system states in which a is allowed and false otherwise;

a single step cost is defined by $\hat{c}(s,a,fh)=c_i(s,a,fh)+c_r(s,a,fh)\cdot\{a.\bar{t}(s,fh)+\text{monitor}.\bar{t}\}$;

$c_r(s,a,fh)$ is a rate cost;

$c_i(s,a,fh)$ is an impulse cost when a controller chooses a recovery action, a, in state s given fault hypothesis fh is true;

$a.\bar{t}(s,fh)$ is a time taken to execute recovery action a in system state s given fault hypothesis fh is true;

monitor.$\bar{t}$ is a time taken to execute monitors;

m is a monitor of a set of monitors M;

$o_m$ denotes an output of a set of monitors M;

$O_{fh}$ denotes possible monitor output combinations that could possibly be generated after a recovery action a is executed with a fault fh present in a system;

a.sEffect(s) is a predicted system state following action a in state s; and

Bayes denotes a Bayesian formula where:

$$P[fh|s, a] = \sum_{fh' \in FH} P[fh']1[a.fhEffect(s, fh') = fh]$$

a.fhEffect(s,fh') is a resulting fault hypothesis when action a is taken in state s when fault hypothesis fh' is true; and $P[o_m|s,a,fh]=P[o_m|fh'\leftarrow a.fhEffect(s,fh)]$.

10. The method of claim 1, further comprising:

terminating the recursively-determined, substantially optimal, multiple-step recovery action after a predetermined number of recursions.

11. The method of claim 1, further comprising:

terminating the recursively-determined, substantially optimal, multiple-step recovery action after a predetermined number of recursions using a heuristic estimate to indicate a limit on a remaining cost of recovery associated with the recursively-determined, substantially optimal, multiple-step recovery action.

12. The method of claim 1, further comprising:

terminating the recursively-determined, substantially optimal, multiple-step recovery action after a predetermined number of recursions; and calculating a heuristic value to represent a remaining cost of recovery associated with the recursively-determined, substantially optimal, multiple-step recovery action via an equation $V(s,\{P[fh]\})=(1-P[fh_\phi])\cdot\max_{a \in A} a.\bar{t}$ where:

V(s, {P|fh|}) is a minimum cost for a sequence of recovery action for a system starting in a state (s,{P[fh]});

fh is a hypothesized fault of a set of possible fault hypotheses FH;

P denotes a probability;

$fh_\phi$ is a null hypothesis denoting a hypothesis that a system is fault free;

a is a recovery action of a set of possible recovery actions A;

s is a system state of a possible set of system states S; and a.$\bar{t}$ is a time taken to execute recovery action a.

13. The method of claim 1, further comprising:

terminating the recursively-determined, substantially optimal, multiple-step recovery action after a predetermined number of recursions; and automatically notifying an operator regarding the fault.

14. The method of claim 1, wherein the recursively-determined, substantially optimal, multiple-step recovery action comprises an attempt to minimize a cost function, the cost function comprising a rate cost component and an impulse cost component.

15. The method of claim 1, wherein the recursively-determined, substantially optimal, multiple-step recovery action comprises restarting a service.

16. The method of claim 1, wherein the recursively-determined, substantially optimal, multiple-step recovery action comprises rebooting an information device.

17. The method of claim 1, wherein the recursively-determined, substantially optimal, multiple-step recovery action comprises starting a service on an information device.

18. A method comprising a plurality of activities, comprising:

receiving information indicative of a fault from a monitor, the monitor one of a plurality of monitors;

responsive to the information indicative of the fault, automatically determining a Bayesian probability of a fault hypothesis, the fault hypothesis one of a plurality of fault hypotheses, the Bayesian probability determined based upon outputs of all of the plurality of monitors; and responsive to a determination of a most probable fault hypothesis of the plurality of fault hypotheses, automatically initiating a single step minimum cost recovery action to correct the fault, a selection of the single step minimum cost recovery action determined based upon historical performance of the single step minimum cost recovery action wherein the recursively-determined, substantially optimal, multiple-step recovery action is selected based upon a solution of a partially observable Markov decision process.

19. A computer-readable medium comprising machine instructions for activities comprising:

receiving information indicative of a fault from a monitor, the monitor one of a plurality of monitors;

responsive to the information indicative of the fault, automatically determining a probability of a fault hypothesis, the fault hypothesis one of a plurality of fault hypotheses, the probability determined based upon outputs of all of the plurality of monitors; and responsive to a determination of a most probable fault hypothesis of the plurality of fault hypotheses, automatically initiating a recursively-determined, substantially optimal, multiple-step recovery action to correct the fault, each step of the multiple-step recovery action associated with a cost, the most probable fault hypothesis determined responsive to an automatically modified value, the recursively-determined, substantially optimal, multiple-step recovery action determined based upon historical performance of the multiple-step recovery action wherein the recursively-determined, substantially optimal, multiple-step recovery action is selected based upon a solution of a partially observable Markov decision process.

* * * * *